United States Patent
Kumbi et al.

(10) Patent No.: US 11,223,663 B1
(45) Date of Patent: Jan. 11, 2022

(54) PROVIDING PERSONALIZED CHAT COMMUNICATIONS WITHIN PORTABLE DOCUMENT FORMAT DOCUMENTS

(71) Applicant: Adobe Inc., San Jose, CA (US)

(72) Inventors: Niranjan Shivanand Kumbi, Fremont, CA (US); Varinder Kumar, Noida (IN); Uddhab Pant, Danville, CA (US); Aditya Bindal, Pahari Dhiraj (IN); Amit Gupta, Rohini (IN); Lakshay Tanwar, New Delhi (IN); Reddy Sreekanth, Visakhapatnam (IN); Ajay Awatramani, Fremont, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/918,531

(22) Filed: Jul. 1, 2020

(51) Int. Cl.
*H04L 29/06* (2006.01)
*G06F 3/048* (2013.01)
*H04L 29/08* (2006.01)

(52) U.S. Cl.
CPC ............ *H04L 65/403* (2013.01); *G06F 3/048* (2013.01); *H04L 67/06* (2013.01)

(58) Field of Classification Search
CPC ........ H04L 65/403; H04L 67/06; G06F 3/048
See application file for complete search history.

(56) References Cited

U.S. PATENT DOCUMENTS

| | | | |
|---|---|---|---|
| 8,407,576 B1 * | 3/2013 | Yin | G06F 8/34 |
| | | | 715/206 |
| 10,530,718 B2 * | 1/2020 | Denoue | G06Q 10/101 |
| 2002/0109712 A1 * | 8/2002 | Yacovone | G06F 16/41 |
| | | | 715/732 |
| 2005/0240618 A1 * | 10/2005 | Nickerson | G06Q 30/02 |
| 2006/0187478 A1 * | 8/2006 | Kongtcheu | G06F 3/1285 |
| | | | 358/1.13 |
| 2006/0265368 A1 * | 11/2006 | Nickerson | G06F 16/958 |
| 2010/0005008 A1 * | 1/2010 | Duncker | G06F 16/972 |
| | | | 705/26.1 |
| 2010/0005411 A1 * | 1/2010 | Duncker | G06F 3/0482 |
| | | | 715/769 |
| 2010/0306249 A1 * | 12/2010 | Hill | G06Q 50/01 |
| | | | 707/769 |
| 2011/0258535 A1 * | 10/2011 | Adler, III | G06F 40/126 |
| | | | 715/235 |
| 2013/0232149 A1 * | 9/2013 | Smith | G06F 16/972 |
| | | | 707/740 |

(Continued)

*Primary Examiner* — Tadesse Hailu
(74) *Attorney, Agent, or Firm* — Keller Jolley Preece

(57) ABSTRACT

The present disclosure relates to systems, non-transitory computer-readable media, and methods for initiating electronic chats based on conversation workflows identified in response to detected user actions in connection with an embedded document container displaying a PDF file. In particular, in one or more embodiments, the disclosed systems detect user interactions with a PDF file displayed by a document container embedded in a webpage. The disclosed systems can determine whether the detected user interactions include or indicate a conversation workflow trigger associated with a conversation workflow. The disclosed systems can further generate electronic messages based on the conversation workflow and provide the generated electronic messages to the user in connection with the webpage where the document container is embedded.

20 Claims, 14 Drawing Sheets

(56) References Cited

U.S. PATENT DOCUMENTS

| | | | |
|---|---|---|---|
| 2014/0278786 A1* | 9/2014 | Liu-Qiu-Yan | G06Q 30/0251 705/7.32 |
| 2014/0356844 A1* | 12/2014 | Bharadwaj | G09B 5/08 434/362 |
| 2015/0310446 A1* | 10/2015 | Tuchman | G06Q 30/016 705/304 |
| 2018/0039606 A1* | 2/2018 | Lysenko | G06F 40/109 |
| 2018/0121394 A1* | 5/2018 | Denoue | H04L 51/02 |
| 2018/0218458 A1* | 8/2018 | Benfield | G06F 16/41 |
| 2019/0108286 A1* | 4/2019 | Pan | G06F 40/216 |
| 2020/0110796 A1* | 4/2020 | Tsabba | G06F 40/154 |
| 2021/0034206 A1* | 2/2021 | Yap | H04L 67/22 |

* cited by examiner

PROVIDING PERSONALIZED CHAT COMMUNICATIONS WITHIN PORTABLE DOCUMENT FORMAT DOCUMENTS

BACKGROUND

Recent years have seen significant improvements in personalizing and enhancing experiences with digital documents via the Internet. To illustrate, conventional systems can enable a user to download a portable document format (PDF) file (e.g., a whitepaper, a brochure, an eBook) from a website. Once downloaded, the user can view the PDF file via a reader application, copy portions of the PDF file, print and save the PDF file, and so forth.

Despite this, such systems have a number of problems in relation to efficiency and flexibility of operation. For instance, conventional systems typically require navigation away from the owner's web site to a third-party reader applications in order for users to open and interact with downloaded PDF files. For example, most digital documents (e.g., PDF files) are not reader agnostic, and require that specific reader applications be utilized. Thus, conventional systems may provide a PDF file in response to a download selection within a website displayed on any of a number of web browsers, but those systems inflexibly require that a user install and utilize a specific type of PDF reader application in order to actually view the contents of the PDF file.

By requiring navigation away from the owner's website to view the contents of a PDF, conventional systems cause user drop off In other words, once user navigate away from the website, as required by conventional systems, they often do not return. Even interested users who desire to return to the website are forced to take various steps to return to the website.

Additionally, as the PDF viewing process is static, many users may lose interest. Furthermore, often users who download a PDF are seeking further information regarding a company or service. The static nature of the PDF viewing process can leave questions unanswered, and otherwise, leave users unsatisfied and lead to missed customer development opportunities.

As conventional systems typically require navigation to a reader application, website owners are limited to the knowledge of which users have downloaded a particular PDF file to their personal computing devices. Thus, website owners are typically unable to determine how the users interacted with the downloaded PDF file—or if they even opened the file. Thus, conventional systems build an incomplete understanding of user interactions with the PDF file.

Additionally, conventional systems are inefficient because they waste computing resources in requiring download of the PDF file prior to the user engaging with the PDF file in any meaningful way. For example, conventional systems generally require that a user must download a PDF file in order to view the same PDF file. Thus, computing resources are wasted in providing the PDF file for download at the server-side, and downloading the PDF file at the client-side. Storage and processing resources are further wasted at the client-side by maintaining and accessing a PDF reader application to enable the user to open and view the downloaded PDF file.

These along with additional problems and issues exist with regard to conventional digital document systems.

BRIEF SUMMARY

This disclosure describes one or more embodiments of systems, non-transitory computer-readable media, and methods that solve the foregoing or other problems or provide other benefits by generating an embeddable document container and providing an engaging and interactive PDF viewing experience without requiring navigation away from a hosting website. To further personalize and enhance the user's experience with the PDF file, the disclosed systems can further identify user action-based conversation triggers relative to the displayed PDF file. Once triggered, the disclosed systems can determine a conversation workflow that corresponds to both the PDF file and the user, and initiate a chat session with the user based on the determined conversation workflow. Thus, the disclosed systems can overcome the shortcomings of the conventional systems, while providing a customized and efficient PDF file experience to the user.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
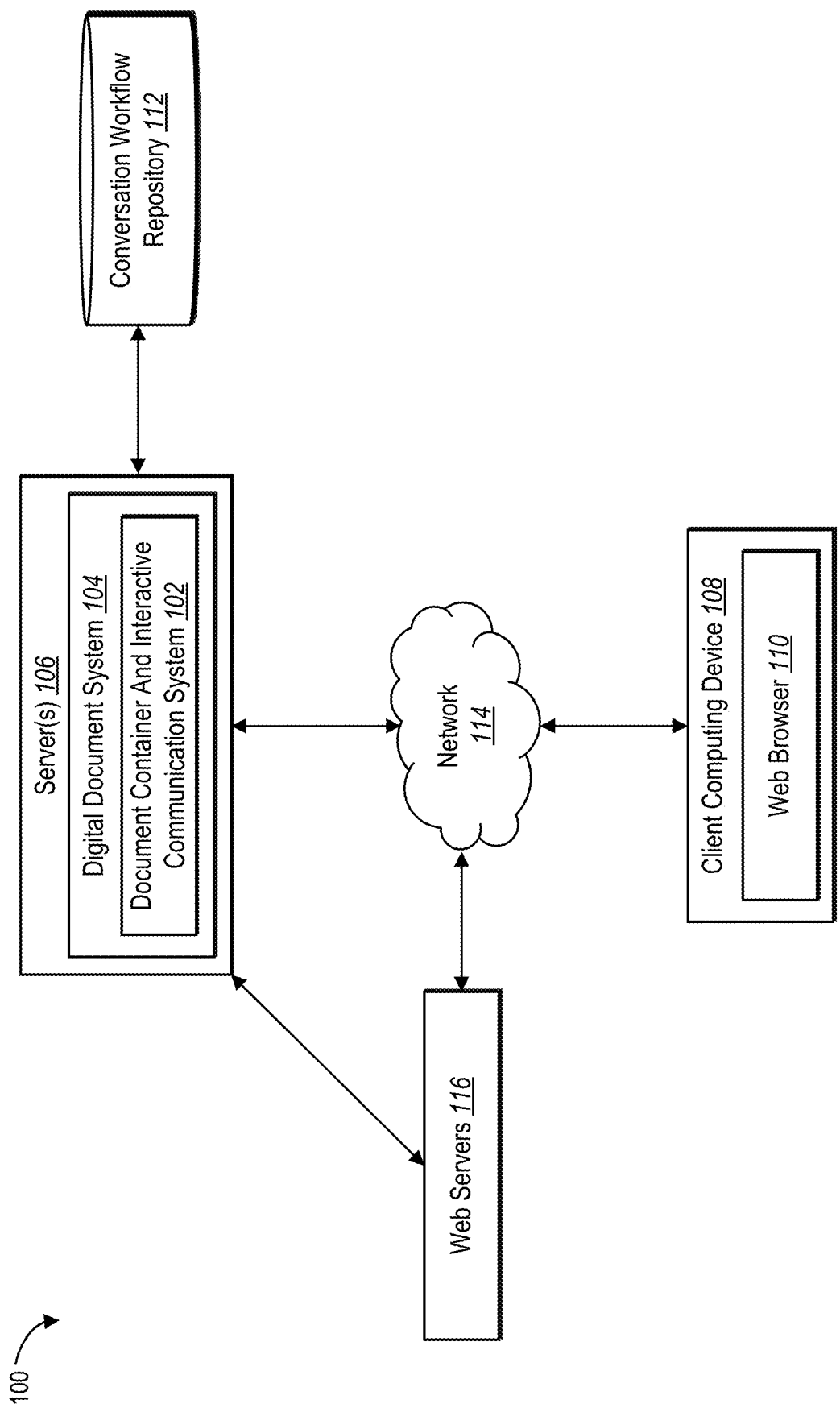
FIG. 1 illustrates an example environment in which a document container and interactive communication system can operate in accordance with one or more embodiments.

This disclosure describes one or more embodiments of a document container and interactive communication system that generates a document container for providing a PDF file within a webpage along with an interactive communication session. In one or more embodiments, the document container and interactive communication system further detects user interactions with the provided PDF file via the document container in order to accurately identify a conversation workflow that corresponds to the PDF file and the viewing user. Based on the identified conversation workflow, the document container and interactive communication system can initiate an electronic chat with the viewing user based on the PDF file. For example, the document container and interactive communication system can generate an electronic message based on the identified conversation workflow and provide the generated electronic message in a communication graphical user interface in connection with the webpage where the document container is embedded.

To further illustrate, the document container and interactive communication system can generate a document container for providing a PDF file within a webpage. For example, the document container and interactive communication system can generate a customized document container that is embeddable within a webpage. In one or more embodiments, the document container and interactive communication system can embed the document container according to one of various modes that control how the document container is displayed within the webpage. For example, the document container and interactive communication system can embed the document container so that it fills the full window of a web browser, so that it is a sized display area within a webpage containing other elements, so that it displays the PDF file in-line within the other contents of the webpage, or so that it appears to hover over the contents of the webpage.

In one or more embodiments, document container and interactive communication system can provide a PDF file for viewing within the embedded document container. For example, the document container and interactive communication system can provide the PDF file within the document container such that the viewing user can interact with the PDF file in any of a number of ways (e.g., similar to the interactions supported by a native PDF reader application). In at least one embodiment, the document container and interactive communication system provides the PDF file within the embedded document container regardless of whether a native document viewer is installed on the client computing device.

Additionally, the document container and interactive communication system can detect user interactions with the PDF file via the document container. For example, the document container and interactive communication system can receive user interaction information from the document container every time the viewing user interacts with the displayed PDF file. In one or more embodiments, the document container and interactive communication system can receive user interaction information when the user accesses or views the PDF file, scrolls to one or more positions within the PDF file, highlights or bookmarks the PDF file, copies a portion of the PDF file, saves the PDF file, prints the PDF file, and so forth.

Furthermore, the document container and interactive communication system can identify one or more conversation workflow triggers based on the detected user interactions. In one or more embodiments, the document container and interactive communication system can analyze the one or more user interactions detected by the document container to identify a conversation workflow trigger. For example, the document container and interactive communication system can perform various actions in response to different identified triggers. To illustrate, the document container and interactive communication system can identify a conversation workflow based on detecting an initial interaction (e.g., opening, accessing) with the PDF file. In another example, the document container and interactive communication system can generate an electronic message according to a conversation workflow in response to a detecting interaction with a specific page of the PDF file. The document container and interactive communication system can identify conversation workflow triggers based on single user interactions or based on combinations of user interactions.

In one or more embodiments, the document container and interactive communication system identifies a conversation workflow based on information associated with the PDF file. For example, the document container on the client computing device can provide information including one or more of an identifier for the PDF, the PDF file title, text associated with the PDF file title, media items associated with the PDF file, or metadata associated with the PDF file. The document container and interactive communication system can identify a corresponding conversation workflow by one or more of these pieces of information or by further analyzing the document information associated with the PDF file utilizing machine learning.

In at least one embodiment, the document container and interactive communication system can further identify the conversation workflow based on information associated with the viewing user of the client computing device. For example, the document container and interactive communication system can analyze demographic information associated with the user, firmographic information associated with the user, past activity information associated with the user, and interaction information associated with the user to further identify a conversation workflow that is customized to both the PDF file and the viewing user. In one or more embodiments, the document container and interactive communication system identifies the conversation workflow by determining that the information associated with the viewing user corresponds to an audience specification associated with the conversation workflow.

Additionally, the document container and interactive communication system can generate electronic messages based on the conversation workflow. For example, the document container and interactive communication system can access the conversation workflow to determine an accurate conversation position associated with PDF file and the viewing user. To illustrate, the document container and interactive communication system can determine that the viewing user is currently accessing the PDF file for the first time (e.g., based on the determined trigger, based on activity and interaction information associated with the user). The document container and interactive communication system can further identify conversation instructions (e.g., one or more conversation prompts) at an initial position in the conversation workflow, and generate an electronic message based on the identified conversation instructions.

In at least one embodiment, based on the user's activity and interaction information, the document container and interactive communication system can determine that the user has interacted with the PDF file or a sponsor or author of the PDF file previously. In that embodiment, the document container and interactive communication system can identify conversation prompts at a later position in the conversation workflow, and generate an electronic message based on the identified conversation prompts that includes language referring to the user's earlier PDF interactions.

Furthermore, the document container and interactive communication system can provide or cause to be provided a communication graphical user interface including the generated electronic message. For example, the document container and interactive communication system can generate the communication graphical user interface and provide the communication graphical user interface in connection with the webpage where the document container is embedded. For instance, the document container and interactive communication system can overlay the communication graphical user interface on all or a portion of the document container displaying the PDF file. In at least one embodiment, the user may engage in electronic communications with the document container and interactive communication system or other systems via the communication graphical user interface.

As mentioned above, the document container and interactive communication system provides many advantages and benefits over conventional systems and methods. For example, the document container and interactive communication system improves the accuracy with which conventional systems detect and track user interactions with a PDF file. A PDF file refers to a portable document format file. In one or more embodiments, a PDF file is a read-only file that can include any combination of text, media, formatting, hyperlinks, and metadata. When displayed, a PDF file preserves a desired layout (e.g., a standard print page).

As mentioned above, the document container and interactive communication system generates and embeds document containers that detect and report interactions of a viewing user with a PDF file. A document container refers to a coded webpage element that is embedded into a webpage. In one or more embodiments, a document container is operating system and browser agnostic and provides a range of functionality relative to PDF files. A document container may display a particular PDF file (e.g., specified in the corresponding code embedded in the webpage HTML), and can enable a viewing user to interact with the PDF file in a variety of ways—all without the viewing user having to leave the webpage in which the document container is embedded.

The document container and interactive communication system can accurately utilize the interactions and other information to engage with the viewing user via a conversation workflow. A conversation workflow refers to a set of conversation instructions that define a messaging order and layout associated with a particular conversation. In one or more embodiments, a conversation workflow is specific to a PDF file and a particular audience. Every conversation instruction in a conversation workflow can include one or more conversation prompts, and a conversation position. For example, the first instruction in a conversation workflow can have an initial conversation position. In one or more embodiments, the document container and interactive communication system generates and provides a conversation workflow that is customized to one or more of 1) the PDF file, 2) the viewing user, or 3) the viewing user's knowledge of and experience with the PDF file (e.g., based on whether the viewing user has previously engaged with the PDF file or a sponsor or author of the PDF file). By being able to accurately track user interactions with the PDF file (e.g., beyond just downloading the PDF file), the document container and interactive communication system enables authors or sponsors of the PDF file to build an accurate understanding of their user base—leading to increases in accuracy relative to targeted marketing campaigns and customer development.

The document container and interactive communication system also improves on the efficiency of conventional systems. As mentioned above, the document container and interactive communication system generates an embeddable document container in a website, such that a viewing user may view and interact with a PDF file without downloading the PDF file, and regardless of whether there is any native PDF viewer installed on the user's client computing device. As such, the document container and interactive communication system avoids the computing waste observed in conventional systems that require both the downloading of the PDF file, and the use of an installed PDF reader application.

Moreover, the document container and interactive communication system is more flexible that conventional systems. For example, as mentioned above, the document container and interactive communication system enables a user to view and interact with a PDF file on any computer that can access a web site with a standard web browser. Thus, the document container and interactive communication system is untethered from the rigid requirements related to file downloads or installed PDF reader applications common to conventional systems.

A conversation workflow can further include an audience specification, conversation workflow trigger information, and other metadata. As used herein, an audience specification refers to one or more characteristics that define a target audience for the associated conversation workflow. For example, an audience specification can define an age group, gender, geographic location, professional level, and income level associated with users who are part of the audience for the associated conversation workflow. As used herein, conversation workflow trigger information associated with the conversation workflow refers to one or more defined user interaction-based triggers that can activate the conversation workflow. For example, the conversation workflow trigger information may include an initial access trigger that matches a user interaction indicating that the user is accessing the corresponding PDF file for the first time. The information for a particular conversation workflow trigger may further include a corresponding conversation position that points to a particular position in the conversation workflow. For example, the initial access trigger may be associated with an initial conversation position that points to the first position in the conversation workflow.

Additional detail regarding the document container and interactive communication system will now be provided with reference to the figures. For example, FIG. 1 illustrates a schematic diagram of an example system environment 100 (e.g., the "environment" 100) for implementing a document container and interactive communication system 102 in accordance with one or more embodiments. Thereafter, a more detailed description of the components and processes of the document container and interactive communication system 102 is provided in relation to the subsequent figures.

As shown in FIG. 1, the environment 100 includes server(s) 106, a client computing device 108, a web server(s) 116, and a network 114. Each of the components of the environment 100 can communicate via the network 114, and the network 114 may be any suitable network over which computing devices can communicate. Example networks are discussed in more detail below in relation to FIG. 8.

As mentioned, the environment 100 includes the client computing device 108. The client computing device 108 can be one of a variety of computing devices, including a smartphone, tablet, smart television, desktop computer, laptop computer, virtual reality device, augmented reality device, or other computing device as described in relation to FIG. 8. In some embodiments, the environment 100 can include any number or arrangement of client computing devices, each associated with a different viewing user. The client computing device 108 can further communicate with the server(s) 106 and/or the web server(s) 116 via the network 114. For example, the client computing device 108 can communicate via the network 114 with the web server(s) 116 to request and view web content (e.g., websites, webpages). The client computing device 108 can further communicate via the network 114 with the server(s) 106 (e.g., via a document container) to report user interactions with a particular PDF file.

In one or more embodiments, the client computing device 108 includes a web browser 110. In one or more embodiments, the web browser 110 communicates with the web server(s) 116 to display a particular webpage. The web browser 110 can further enable a viewing user to interact with a displayed webpage. The web browser 110 can further support plugins, cookies, temporary internet files, or the like.

As further illustrated in FIG. 1, the environment 100 includes the server(s) 106. The server(s) 106 may include one or more individual servers that may generate, store, receive, and transmit electronic data. For example, the server(s) 106 may receive data from and transmit data to the client computing device 116*a*. Similarly, the server(s) 106 may transmit data to the web server(s) 116 as part of the communication process with the viewing user of the client computing device 108.

As further shown in FIG. 1, the server(s) 106 can also include the document container and interactive communication system 102 as part of a digital document system 104. The digital document system 104 can store, retrieve, provide, configure, and display digital documents (e.g., PDF files). In at least one embodiment, the document container and interactive communication system 102 operates a part of the functionality provided by the digital document system 104. In one or more embodiments, the document container and interactive communication system 102 can also access a conversation workflow repository 112. For example, the conversation workflow repository 112 includes conversation workflows configured in association with webpages provided by the web server(s) 116 and PDF files stored by the digital document system 104.

Although FIG. 1 depicts the document container and interactive communication system 102 located on the server(s) 106, in some embodiments, the document container and interactive communication system 102 may be implemented by (e.g., located entirely or in part) on one or more other components of the environment 100. For example, the document container and interactive communication system 102 may be implemented in whole or in part by the web server(s) 116.

Figure 2:
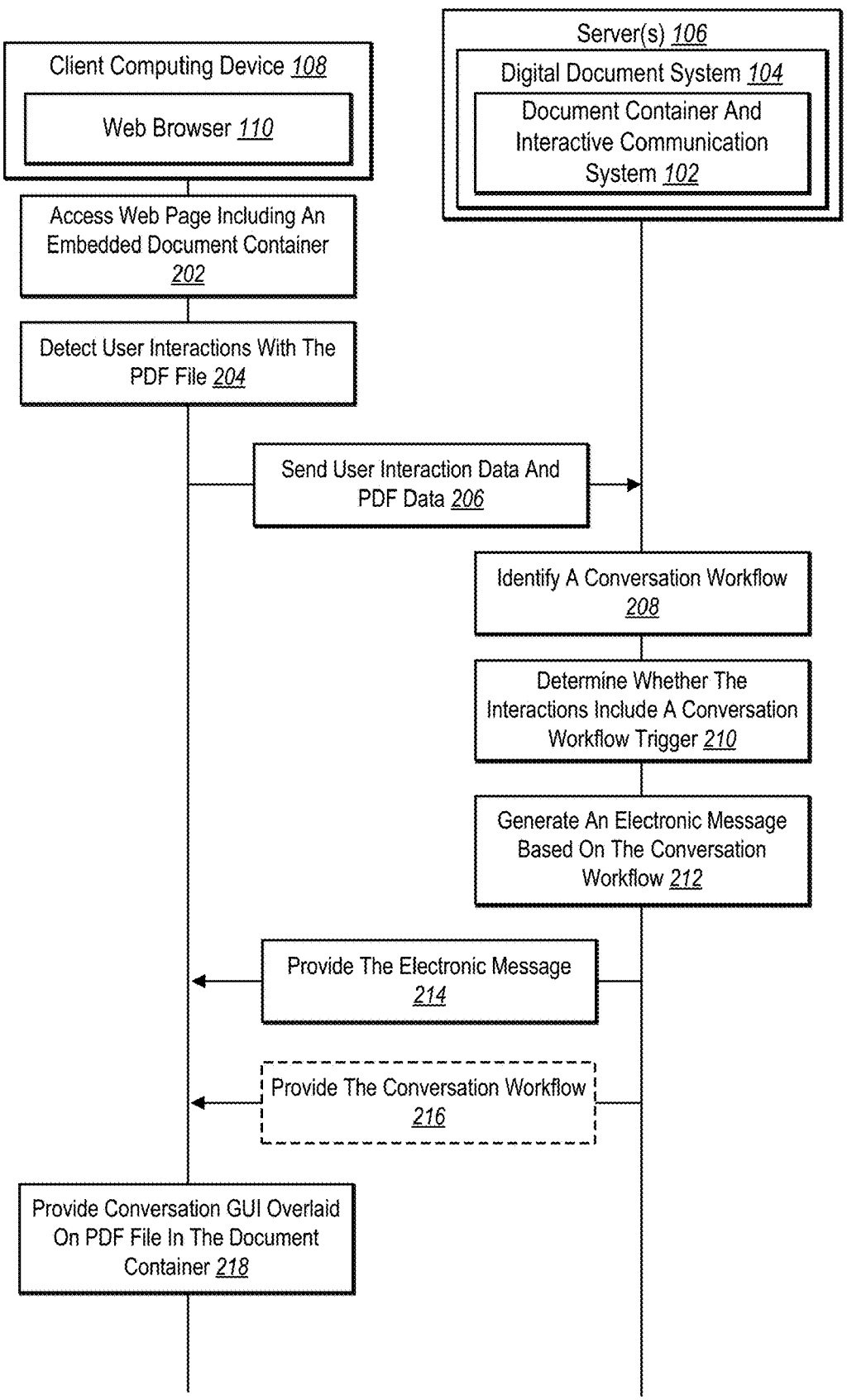
FIG. 2 illustrates a sequence diagram of the document container and interactive communication system providing personalized electronic communications to a client computing device via a document container embedded in a website displayed by the client computing device in accordance with one or more embodiments.

FIG. 2 illustrates a sequence diagram of the document container and interactive communication system 102 providing personalized electronic communications to the client computing device 108 in connection with a document container embedded in a website displayed by the client computing device 108. For example, the client computing device 108 can access a webpage including an embedded document container 202. In one or more embodiments, the client computing device 108 can access the webpage with the web browser 110 in order to view the contents of the webpage. The webpage can include any combination of display elements, scripts, plugins, media players, and so forth.

In at least one embodiment, the document container may be embedded in the webpage in one of various modes. For example, and as will be discussed in greater detail below with reference to FIGS. 3A-3D, the document container and interactive communication system 102 can enable the embedding of the document container according to a full-window embedding mode, a sized container embedding mode, an in-line embedding mode, or a light-box embedding mode. In one or more embodiments, the various embedding modes dictate how the document container appears within the webpage.

As mentioned above, the document container and interactive communication system 102 enables the document container to be embedded in the webpage in association with a particular PDF file. For example, the webpage administrator may embed the document container by adding software code to the webpage file that specifies a specific PDF file for the document container to display. Thus, when the web browser 110 loads the webpage for display on the client computing device 108, the document container software code (e.g., a software development kit) can fetch the PDF file (e.g., either locally stored or from the digital document system 104) and display the PDF file according to a specified embedding mode (e.g., specified by the document container software code added to the webpage file).

In one or more embodiments, the document container can detect one or more user interactions with the PDF file displayed therein 204. For example, the document container can detect that the PDF file is accessed or displayed via the webpage. More specifically, the document container can detect when the PDF file is viewable within the webpage (e.g., based on scroll position of the webpage relative to the document container's position in the webpage and/or based on embedding mode). The document container can further detect additional user interactions with the PDF file including, but not limited to, scrolling PDF file, downloading the PDF file, printing the PDF file, searching the PDF file, bookmarking the PDF file, zooming in or out on the PDF file, copying one or more portions of the PDF file, and/or clicking on a hyperlink in the PDF file.

In response to detecting one or more user interactions with the PDF file, the document container can send user interaction data and PDF data 206 to the document container and interactive communication system 102. For example, the document container (e.g., via the software code embedded in the webpage displayed by the web browser 110) can send information detailing the type of user interaction along with PDF file information. In at least one embodiment, the PDF file information can include the title or name of the PDF file, some or all of the contents of the PDF file (e.g., text and media), and any metadata associated with the PDF file (e.g., authorship information, keywords associated with the PDF file, timestamp information associated with the PDF file).

In at least one embodiment, the document container can further provide user information associated with the user of the client computing device 108 in response to detecting one or more user interactions with the PDF file. For example, the document container can identify and provide demographic information associated with the user, firmographic information associated with the user, past activity information associated with the user, and interaction information associated with the user relative to the PDF file. In one or more embodiments, the document container can identify this user information by accessing a web cookie, a temporary internet file, and/or a system file stored on the client computing device 108.

To further illustrate, the document container can identify demographic information including the user's name, user identifier, age, gender, and location. The document container can also identify firmographic information including the user's occupation, employer, job title, length of employment, and job description. The document container can further identify past activity information including the user's web browser history, and the user's application use history (e.g., stored by the client computing device 108). Additionally, the document container can identify interaction information relative to the PDF file including whether the user has previously accessed the PDF file, and/or has interacted with an author or sponsor of the PDF file (e.g., based on the user's browser history indicating the user has visited a website associated with the author or sponsor of the PDF file).

In response to receiving the user interaction information from the document container via the web browser 110, the document container and interactive communication system 102 can identify a conversation workflow 208. For example, as discussed in greater detail below with reference to FIG. 5, the document container and interactive communication system 102 can identify one or more conversation workflows that correspond to the PDF file within the document container. The document container and interactive communication system 102 can then determine if the user information associated with the user of the client computing device 108 matches or correlates with an audience specification of one of the one or more identified conversation workflows.

In response to identifying an appropriate conversation workflow based on the PDF file information and user information, the document container and interactive communication system 102 can determine whether the detected user interactions include a conversation workflow trigger 210. In one or more embodiments, an administrator can configure the conversation workflow to be triggered by one or more predefined user interactions. Thus, the conversation workflow can include a definition or specification of the one or more user interactions that are conversation workflow triggers for that conversation workflow. Accordingly, in at least one embodiment, the document container and interactive communication system 102 determines that the detected user interactions include a conversation workflow trigger for the identified conversation workflow by comparing the detected user interactions to the one or more defined conversation workflow triggers associated with the identified conversation workflow. The conversation workflow can define conversation workflow triggers that include a single detected user interaction (e.g., accessing the associated PDF file), or a combination of detected user interactions (e.g., accessing the associated PDF file and scrolling to the third page of the PDF file).

If the document container and interactive communication system 102 determines that the detected user interactions do not include a conversation workflow trigger, the document container and interactive communication system 102 can continue analyzing any further indications of detected user interactions with the PDF file until a conversation workflow trigger is identified. If the document container and interactive communication system 102 determines that the detected user interactions include a conversation workflow trigger, the document container and interactive communication system 102 can generate an electronic message based on the conversation workflow 212. For example, the document container and interactive communication system 102 can generate the electronic message by first determining a conversation position in the conversation workflow that corresponds to the conversation workflow trigger. For instance, if the conversation workflow trigger indicates that the user is accessing the PDF file for the first time, the document container and interactive communication system 102 can identify an initial conversation position in the conversation workflow. If the conversation workflow trigger indicates that the user has highlighted a particular section of the PDF file, the document container and interactive communication system 102 can identify a conversation position that corresponds to that user interaction. If the conversation workflow trigger indicates that the user is accessing the PDF file after a previous interaction with the author or sponsor of the PDF file, the document container and interactive communication system 102 can access a conversation position that corresponds to those previous interactions.

After identifying and accessing the conversation position that corresponds to the conversation workflow trigger, the document container and interactive communication system 102 can generate the electronic message based on the conversation instructions at that conversation position. For example, the conversation position may include instructions including one or more conversation prompts. To illustrate, each of the prompts may be mapped to particular user characteristics, such as gender or location. In one or more embodiments, the document container and interactive communication system 102 can determine a conversation prompt that corresponds to the user of the client computing device 108 (e.g., by matching the user characteristics specified by the conversation prompt to the user information associated with the user of the client computing device 108), and generate an electronic message including the contents of the prompt. For example, the conversation prompt may include text, media, and/or hyperlinks.

The document container and interactive communication system 102 can further provide the generated electronic message 214 to the client computing device 108. For example, the document container and interactive communication system 102 can provide the generated electronic message as part of a communication graphical user interface for display on the client computing device 108. In one or more embodiments, the document container and interactive communication system 102 can generate the communication graphical user interface in the form of an electronic chat interface that include a message thread in one portion of the interface, and a text input area in another portion of the interface. The document container and interactive communication system 102 can include the generated electronic message in the message thread within the communication graphical user interface. Additionally or alternatively, the document container and interactive communication system 102 can provide the generated electronic message to the document container at the client computing device 108. The document container can then generate the communication graphical user interface including the generated electronic message. Additionally or alternatively, the document container and interactive communication system 102 can cause the communication graphical user interface to be provided to the client computing device 108 by sending the generated electronic message to a third-party communication platform.

In at least one embodiment, the document container and interactive communication system 102 can provide the identified conversation workflow 216 to the client computing device 108. For example, the document container and/or the webpage embedded with the document container can receive the conversation workflow in order to engage with the user of the client computing device 108 in an electronic chat session. For instance, as discussed above, the conversation workflow includes instructions dictating responses to various types of inputs from the user of the client computing device 108 in an electronic chat session. Thus, once the document container and interactive communication system 102 initiates the electronic chat session by providing the generated electronic message, the document container and/or webpage can continue the chat session based on the received conversation workflow. In an additional or alternative embodiment, the document container and interactive communication system 102 can provide the conversation workflow to the client computing device 108 prior to generating the electronic message. In that embodiment, the document container and/or webpage may generate the electronic message in order to initiate the electronic chat session with the user of the client computing device 108.

In response to receiving the communication graphical user interface from the document container and interactive communication system 102, the document container can provide the conversation graphical user interface overlaid on the PDF file in the document container 218. For example, the document container and interactive communication system 102 can provide the communication graphical user interface such that the document container overlays the communication graphical user interface on at least a portion of the displayed PDF file. In at least one embodiment, the document container and interactive communication system 102 can further provide the communication graphical user interface such that the PDF file is deactivated (e.g., losses focus, is no longer scrollable) in the document container while the communication graphical user interface is overlaid. Additionally or alternatively, the document container and interactive communication system 102 can provide the communication graphical user interface such that it is displayed adjacent to the document container, or overlaid on just a portion of the PDF file. After providing the communication graphical user interface, the document container and interactive communication system 102 (e.g., alone or in combination with the document container) and/or the webpage displayed by the web browser 110 can engage in a continued electronic chat session with the user of the client computing device 108 according to the conversation workflow via the communication graphical user interface.

Figure 3A:
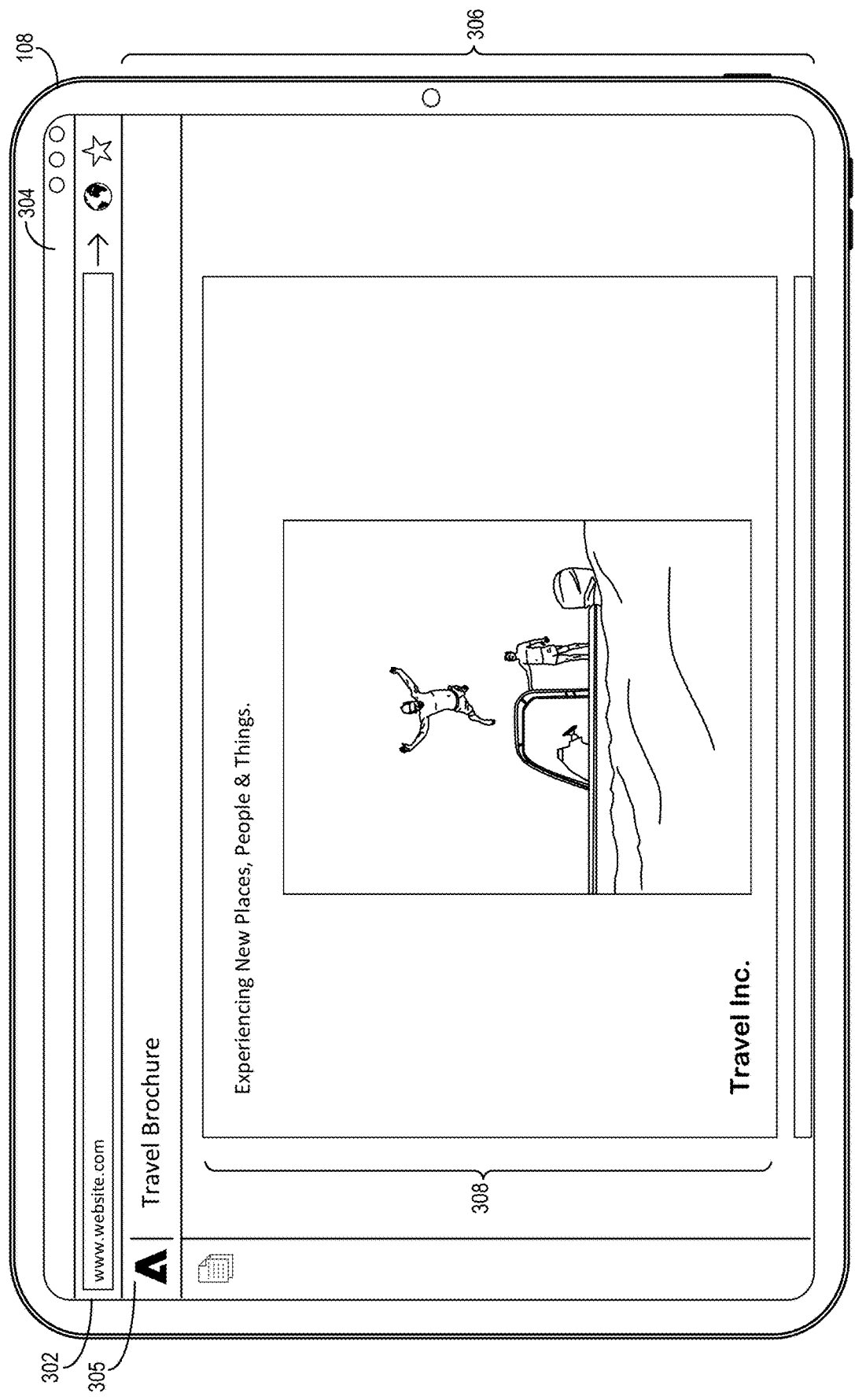
FIGS. 3A-3D illustrate a document container embedded in a webpage according to a variety of embedding modes in accordance with one or more embodiments.

As discussed above, the document container and interactive communication system 102 can enable a document container to be embedded in a webpage in various ways according to an embedding mode. FIGS. 3A-3D illustrate the various embedding modes associated with a document container. For example, as shown in FIG. 3A, the document container and interactive communication system 102 can enable a document container to be embedded in a webpage 305 according to a full-window embedding mode. As shown, the client computing device 108 can provide a web browser 304 in a display 302 (e.g., a touch-screen display). The document container and interactive communication system 102 can further enable a document container 306 to be embedded in the full-window embedding mode such that the document container 306 fills the full display area of the web browser 304, and no other elements (e.g., menu items, webpage text, hyperlinks) of the webpage 305 are visible. The document container 306 can display a PDF file 308 such that a user of the client computing device 108 can scroll through, and otherwise interact with, the PDF file 308.

Figure 3B:
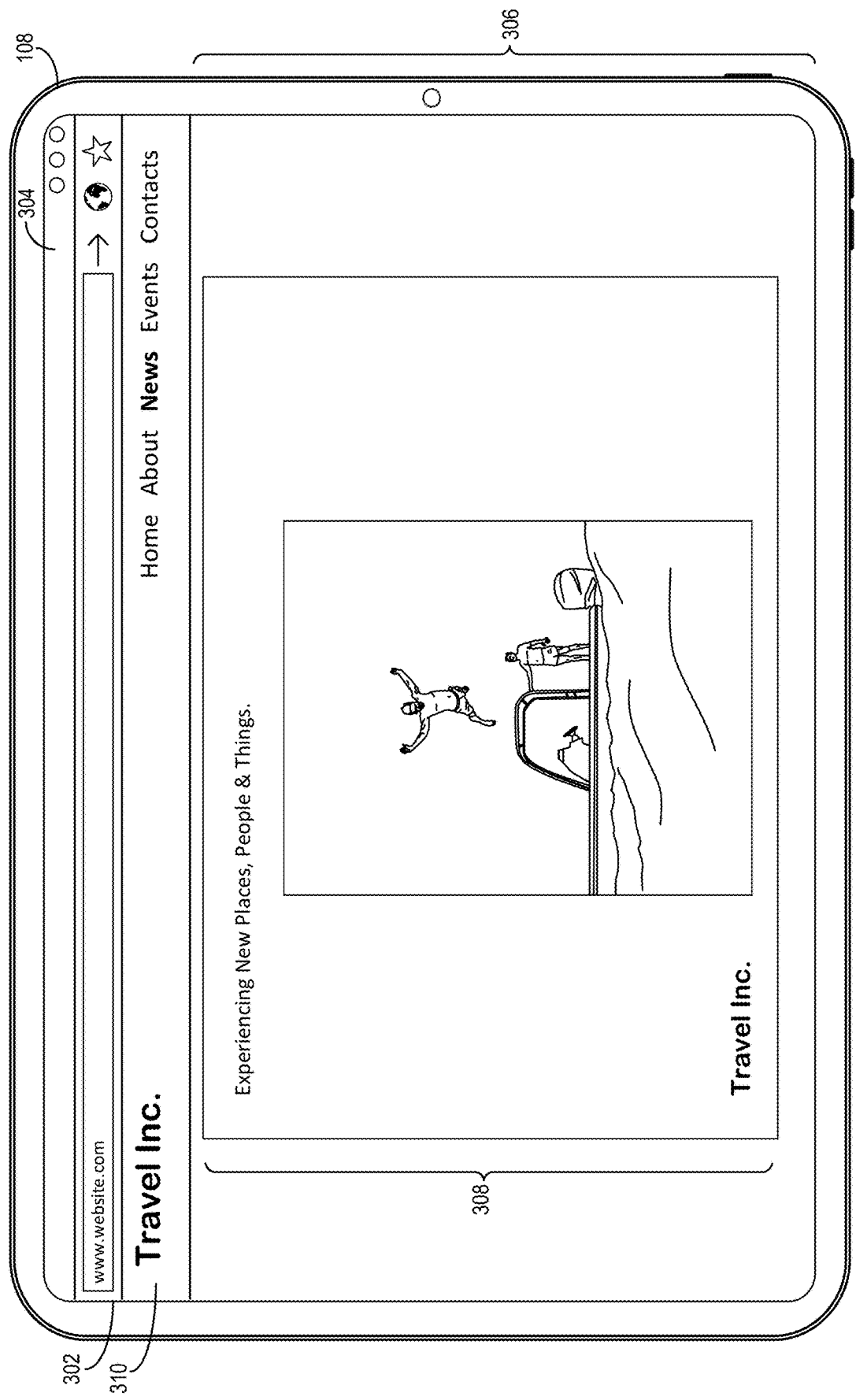

As shown in FIG. 3B, the document container and interactive communication system 102 can enable the document container 306 to be embedded in the webpage 305 according to a sized container embedding mode. For example, when the document container 306 is in a sized container mode, other webpage elements, such as the menu 310, are visible. As shown, while in sized container embedding mode, the document container 306 provides the PDF file 308 in connection with all the reader functionality discussed above. For example, the user of the client computing device 108 can scroll through the PDF file 308 by scrolling over the document container 306 while other surrounding webpage elements remain static. But because the document container 306 is in sized container embedding mode, the user can further scroll through the webpage 305 in response to scrolling over any other area of the webpage 305. For instance, in response to detecting a scroll user interaction over any other area of the webpage 305, the web browser 304 can scroll the document container 306 out of view.

Figure 3C:
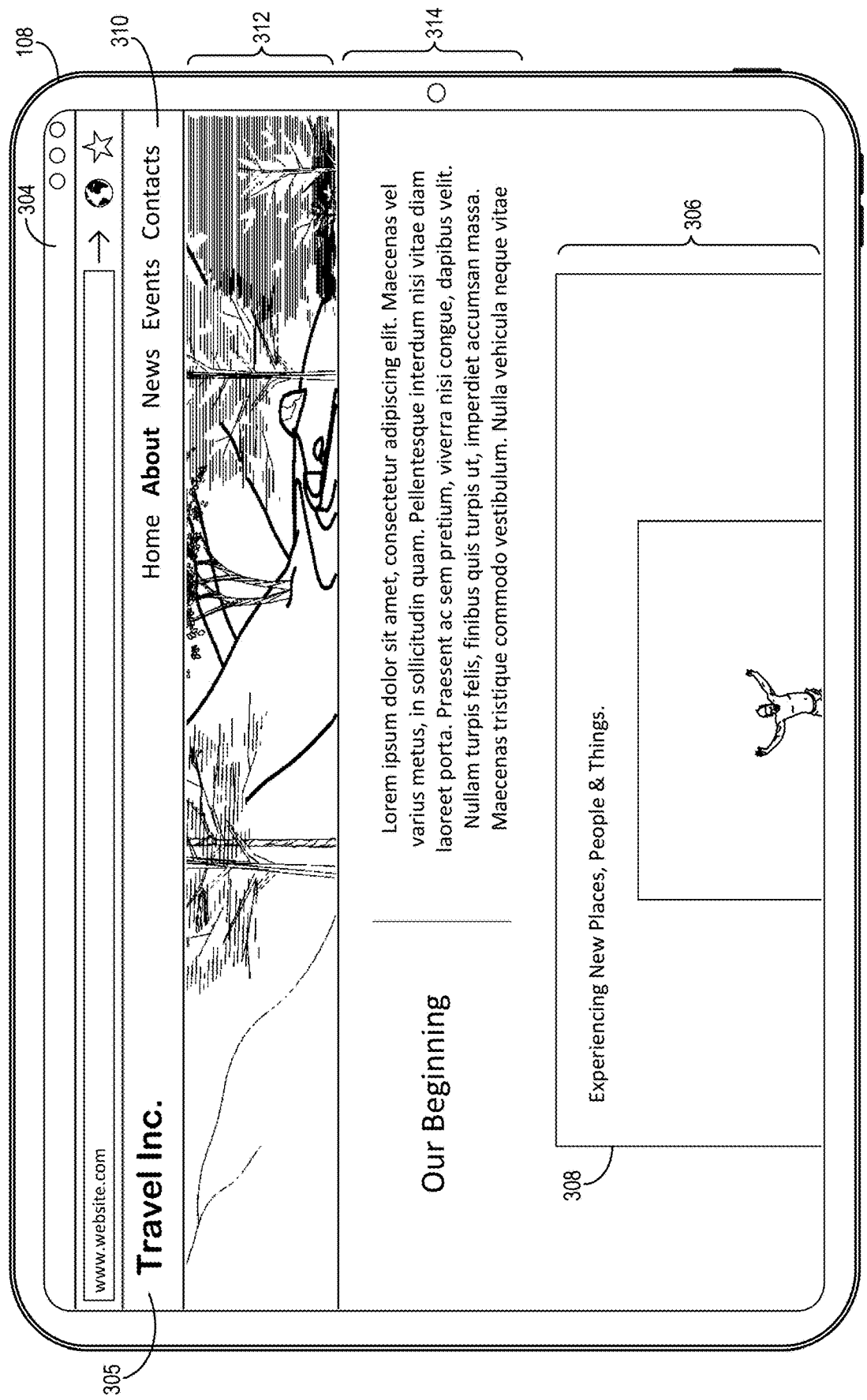

As shown in FIG. 3C, the document container and interactive communication system 102 can enable the document container 306 to be embedded in the webpage 305 according to an in-line embedding mode. For example, when the document container 306 is in an in-line embedding mode, the document container 306 dynamically sizes itself to display the PDF file 308 in its entirety in-line with the other webpage elements of the webpage 305, such as the menu 310, a header image 312, and text 314. For instance, in response to a detected user scroll anywhere on the webpage 305, the web browser 304 can progressively display the remainder of the document container 306, and relatedly the PDF file 308.

Figure 3D:
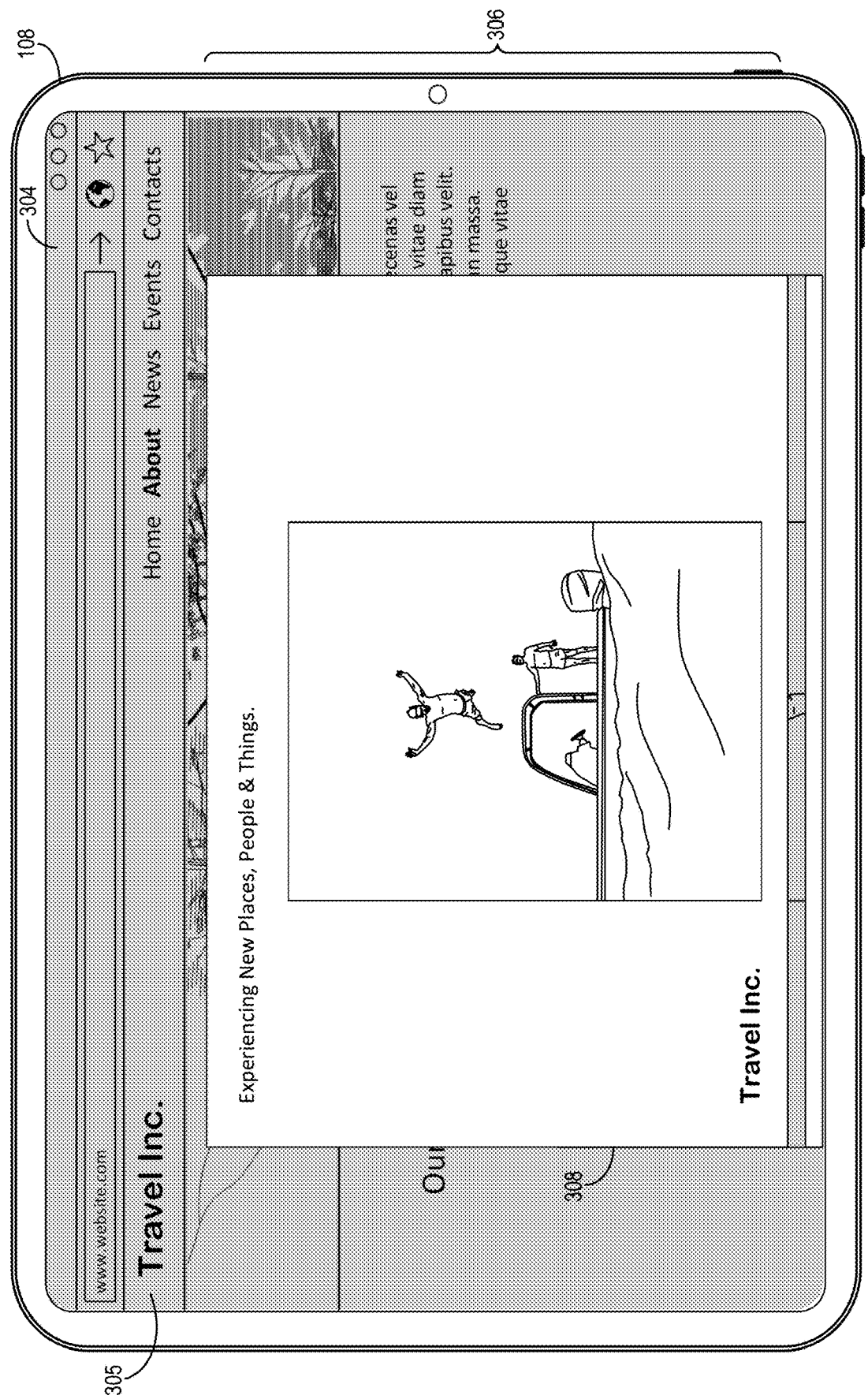

As shown in FIG. 3D, the document container and interactive communication system 102 can enable the document container 306 to be embedded in the webpage 305 according to a light-box embedding mode. For example, while in light-box embedding mode, the document container and interactive communication system 102 causes the document container 306 to be overlaid on the webpage 305. In response to detecting a user scroll anywhere over the web browser 304, the document container 306 can progressively display portions of the PDF file 308. As further shown, while the document container 306 is overlaid in light-box embedding mode, the document container 306 can deactivate the webpage 305. In at least one embodiment, the document container 306 can reactivate the webpage 305 in response to a detected user interaction that dismisses or closes the document container 306.

Figure 4A:
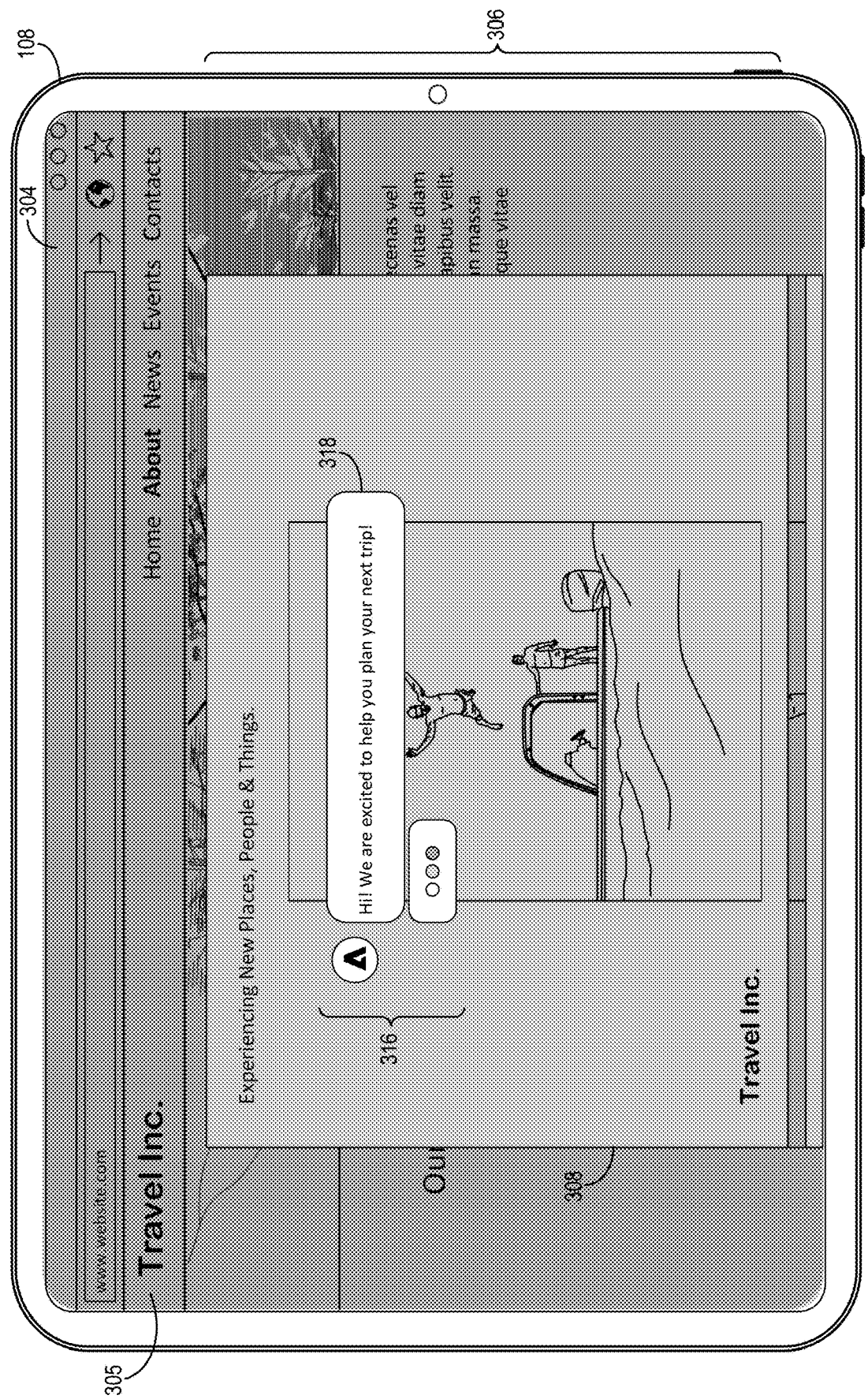
FIGS. 4A-4B illustrate a communication graphical user interface provided in connection with a webpage embedded with a document container in accordance with one or more embodiments.
Figure 4B:
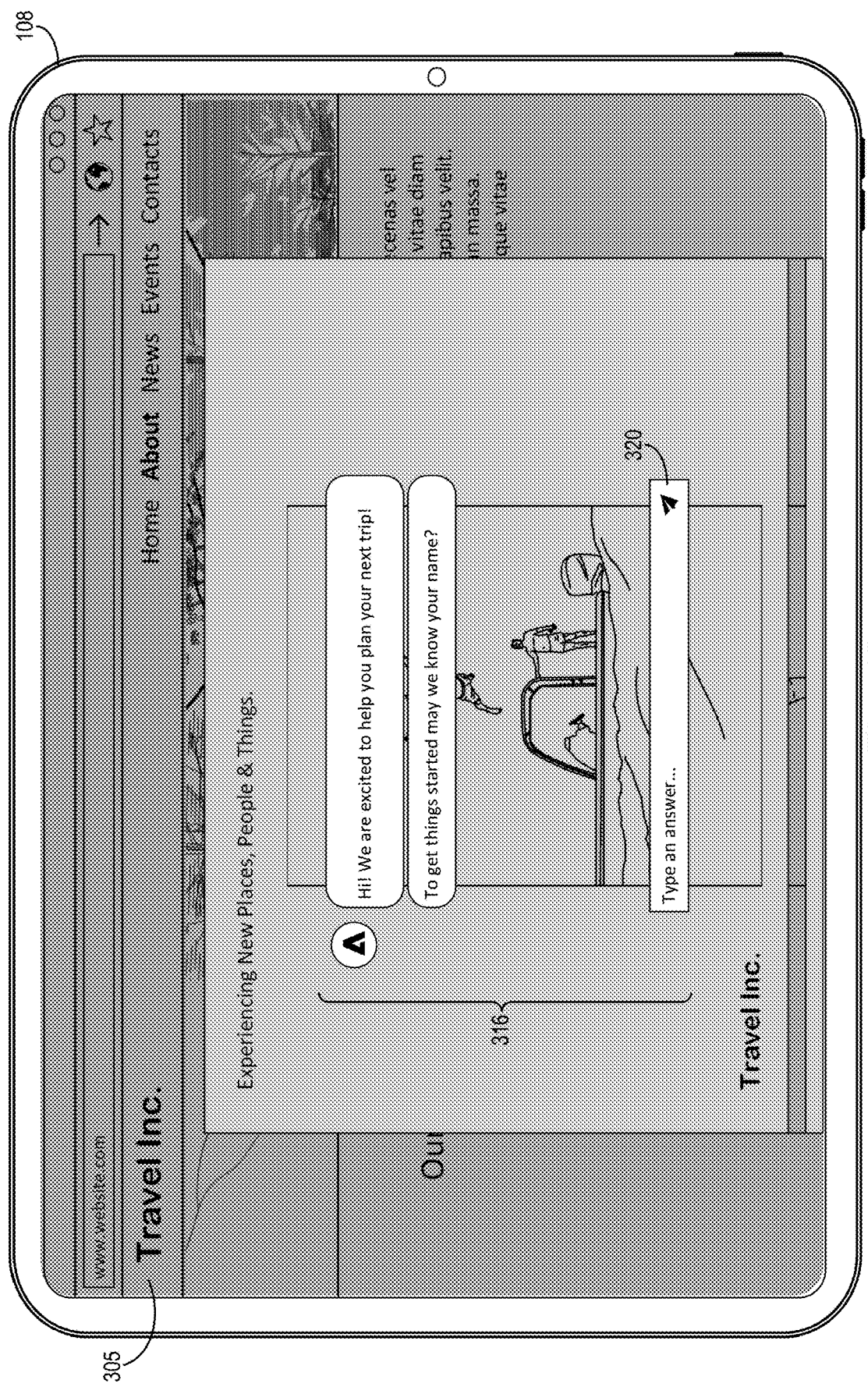

As discussed above, in response to detected user interactions with a PDF file in a document container embedded on a webpage, the document container and interactive communication system 102 can initiate an electronic chat session based on a conversation workflow that corresponds to the PDF file. FIGS. 4A and 4B illustrate additional detail with regard to the electronic chat session initiated by the document container and interactive communication system 102. For example, as shown in FIG. 4A, in response to detected user interactions with the PDF file 308 in the document container 306, the document container and interactive communication system 102 can identify a conversation workflow corresponding to the PDF file 308 and optionally to the user of the client computing device 108. The document container and interactive communication system 102 can further determine that the detected user interactions include or correspond to a conversation workflow trigger associated with the identified conversation workflow.

The document container and interactive communication system 102 can then determine a conversation position based on the conversation workflow trigger. For example, as shown in FIG. 4A, in response to determining that the conversation workflow trigger indicates that the user of the client computing device 108 is accessing the PDF file 308 for the first time, the document container and interactive communication system 102 can identify conversation instructions at an initial position in the conversation workflow. In another embodiment, in response to determining that the conversation workflow trigger indicates that the user of the client computing device 108 has previously accessed the PDF file 308, the document container and interactive communication system 102 can identify a different position in the conversation workflow that corresponds to the previous level of interaction associated with the PDF file 308.

After identifying the conversation position in the conversation workflow, the document container and interactive communication system 102 can generate an electronic message 318 based on one or more prompts in the conversation instructions at the identified conversation position. For example, the document container and interactive communication system 102 can match one or more characteristics of the user of the client computing device 108 to characteristics of at least one conversation prompt. The document container and interactive communication system 102 can then generate the electronic message 318 including the matched conversation prompt (e.g., "Hi! We are excited to help you plan your next trip!").

As further shown in FIG. 4A, the document container and interactive communication system 102 (e.g., either at the server(s) 106 or via the document container 306) can provide, or cause to be provided, the generated electronic message 318 via a communication graphical user interface 316. For example, the document container and interactive communication system 102 can provide then communication graphical user interface 316 in connection with the webpage 305. In one or more embodiments, the document container and interactive communication system 102 can overlay the communication graphical user interface 316 on the document container 306, or on any other portion of the webpage 305.

As shown in FIG. 4B, the document container and interactive communication system 102 can further generate the communication graphical user interface 316 to enable further communication between the user of the client computing device 108 and the document container and interactive communication system 102 and/or a third-party associated with the webpage 305. For example, the document container and interactive communication system 102 can generate the communication graphical user interface 316 to include a text input box 320. In one or more embodiments, the user of the client computing device 108 can input an electronic message via the text input box 320, and the document container and interactive communication system 102 and/or the third-party associated with the webpage 305 can generate further electronic messages according the conversation workflow.

Although the communication graphical user interface 316 is illustrated as being overlaid on the document container 306 in FIGS. 4A and 4B, the document container and interactive communication system 102 can cause the communication graphical user interface 316 to be provided anywhere in connection with the webpage 305. For example, in an additional or alternative embodiment, the document container and interactive communication system 102 can provide the communication graphical user interface 316 adjacent to the document container 306. In such an embodiment, the document container and interactive communication system 102 can leave the PDF file 306 activated such that the user of the client computing device 108 can continue interacting with the PDF file 306 while engaging in an electronic chat session via the communication graphical user interface 316. Furthermore, in that embodiment, the document container and interactive communication system 102 can identify additional conversation prompts in response to both the user's electronic message responses and the user's further interactions with the PDF file 306.

As discussed above, and as shown in FIGS. 4A and 4B, the document container and interactive communication system 102 can initiate an electronic chat session with the user of the client computing device 108 according to a particular conversation workflow. In one or more embodiments, the document container and interactive communication system 102 can enable a sponsor or author associated with a particular PDF file to configure or define one or more conversation workflows associated with the particular PDF files. For example, FIGS. 4C and 4D illustrate additional details with regard to features of the document container and interactive communication system 102 that enable an author or sponsor to configure or define a target audience and an associated conversation workflow.

Figure 4C:
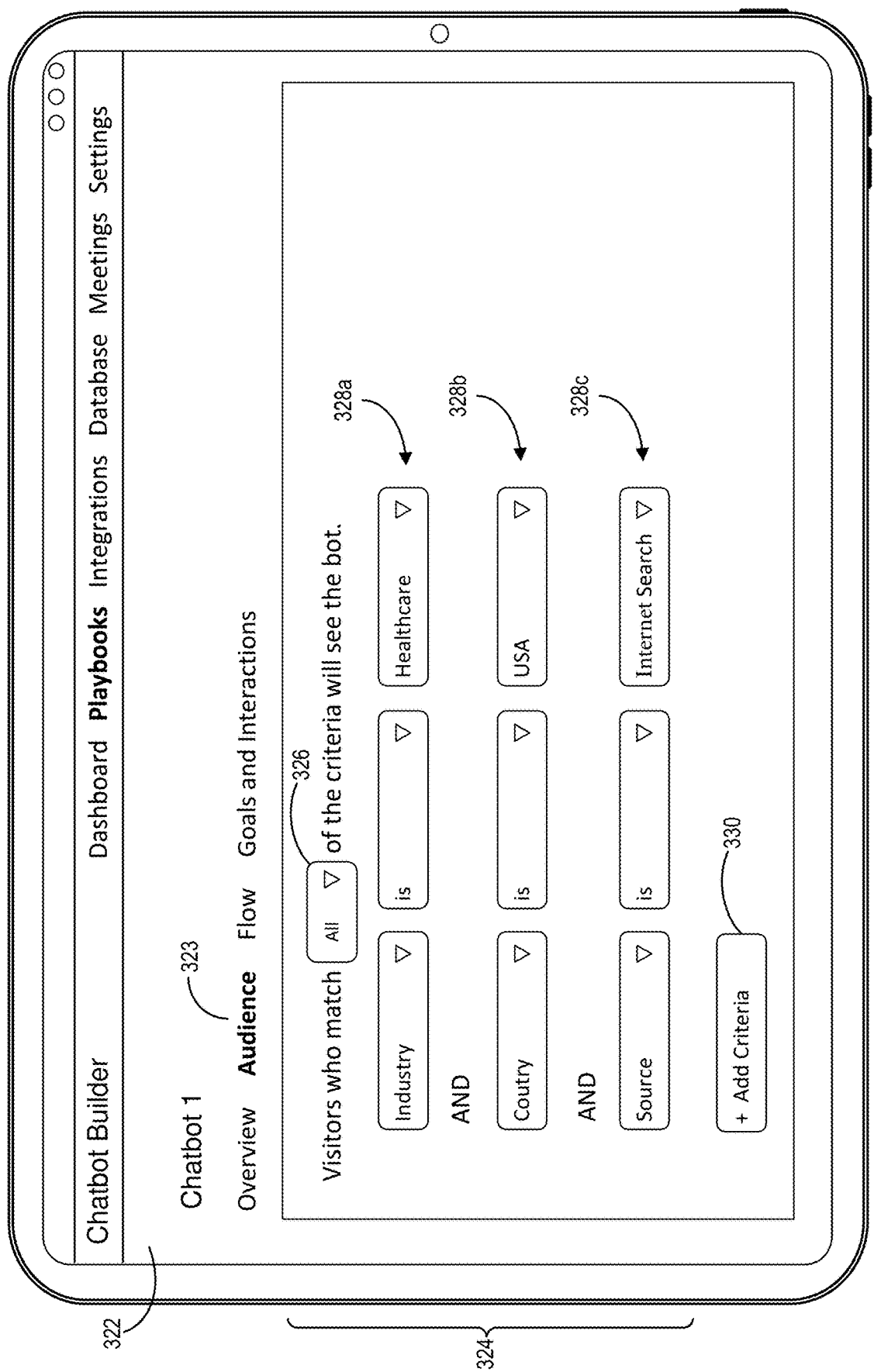
FIGS. 4C-4D illustrate a conversation workflow graphical user interface for configuring a conversation workflow in accordance with one or more embodiments.
Figure 4D:
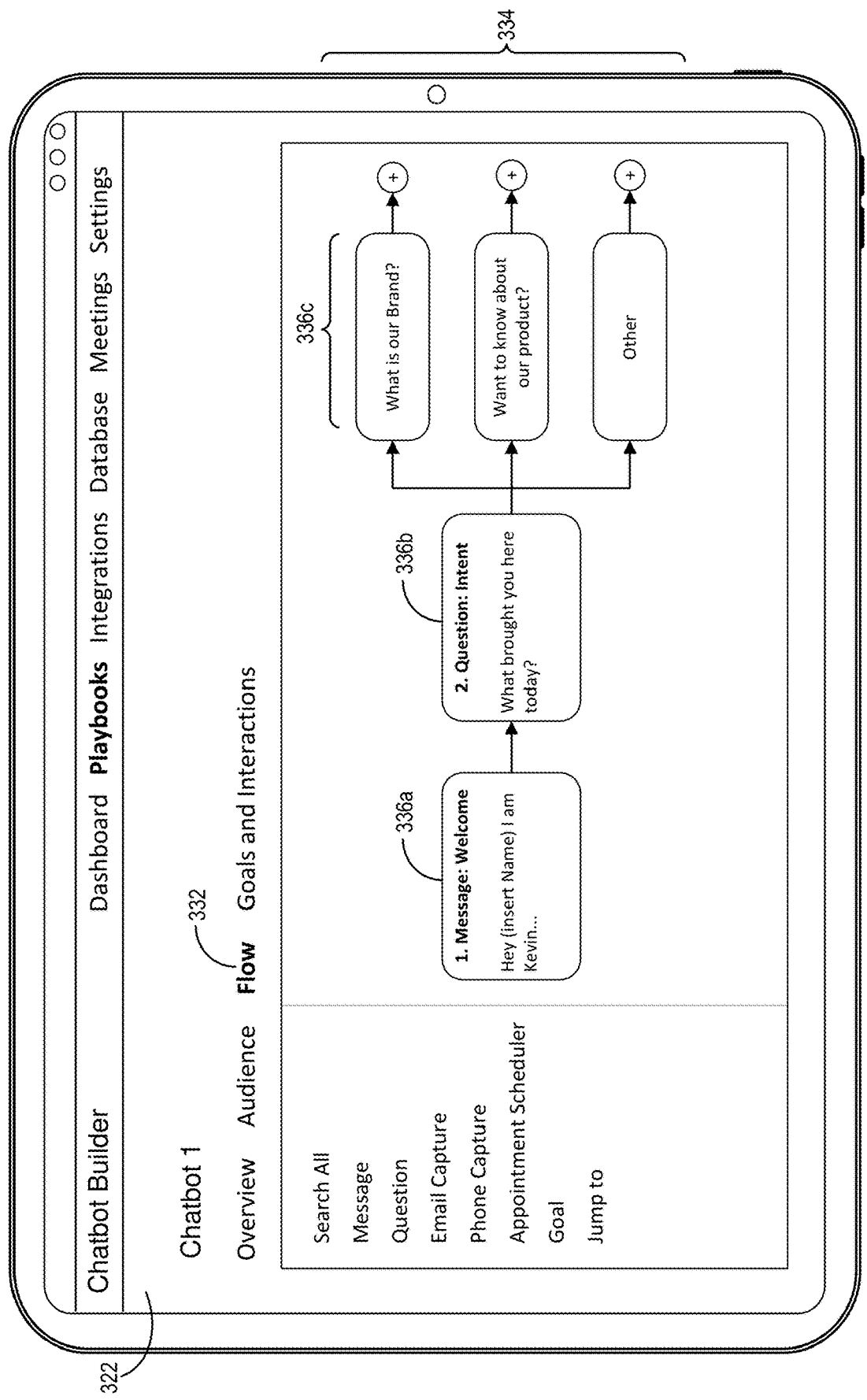

For instance, as shown in FIG. 4C, the document container and interactive communication system 102 can provide a conversation workflow graphical user interface 322. In one or more embodiments, the document container and interactive communication system 102 generates the conversation workflow graphical user interface 322 with different options and elements by which a PDF file author or sponsor can define an audience specification, a flow of conversation instructions, and other goals and interaction triggers associated with a conversation workflow for the PDF file. For example, as shown in FIG. 4C, in response to a detected selection of the audience tab 323, the author or sponsor can configure and/or define an audience specification with the audience specification display 324 via the controls 326, 328a, 328b, 328c, and 330.

In one or more embodiments, the document container and interactive communication system 102 generates an audience specification for the associated PDF file based on the definition configured by the author or sponsor via the audience specification display 324. To illustrate, the author or sponsor can select audience characteristics via the criteria controls 328a-328c. The author or sponsor can further define how strictly the document container and interactive communication system 102 applies the audience characteristics via the visitors control 326. The document container and interactive communication system 102 can add additional criteria controls in response to a detected selection of the add criteria control 330.

In response to the detected selections of any of the controls 326, 328a, 328b, 328c, and 330, the document container and interactive communication system 102 can generate a corresponding audience specification. For example, based on the selections illustrated in FIG. 4C, the document container and interactive communication system 102 audience may initiate an electronic chat with PDF viewers who 1) work in healthcare, 2) live in the USA, and 3) found the PDF via an Internet search.

As further shown in FIG. 4D, in response to a detected selection of a flow tab 332 in the conversation workflow graphical user interface 322, the document container and interactive communication system 102 can enable an author or sponsor to view, edit, reorder, add, or delete conversation instructions within the current conversation workflow. For example, the document container and interactive communication system 102 can provide the conversation instructions 336a, 336b, and 336c in an associated flow 334. As shown, the flow 334 indicates the order and conversation text associated with each of the conversation instructions 336a-336c. In response to a detected selection of any of the conversation instructions 336a-336c, the document container and interactive communication system 102 can enable the order and conversation text associated with the selected conversation instruction to be edited or removed.

As further shown, the document container and interactive communication system 102 enables forking conversation instructions (e.g., as with the conversation instruction 336c). In one or more embodiments, the document container and interactive communication system 102 enables a forking conversation instruction based on a particular user response. For example, the document container and interactive communication system 102 enables the forking conversation instruction 336c in response to specific responses defined in the conversation instruction 336b. In at least one embodiment, but enabling forking conversation instructions, the document container and interactive communication system 102 enables an author or sponsor to configure the flow 334 so as to cover a wide range of conversational possibilities.

Once the flow 334 is defined, the document container and interactive communication system 102 can engage in an electronic chat with a user of the client computing device 108 by following the flow 334—providing the user of the client computing device 108 corresponds to the audience specification configured in the audience specification display 324, as discussed above. In additional or alternative embodiments, the document container and interactive communication system 102 can provide the conversation workflow (e.g., as configured via the conversation workflow graphical user interface 322) to a third-party communication platform (e.g., a chat bot or similar).

As mentioned above, the document container and interactive communication system 102 can determine a conversation workflow (e.g., from the conversation workflow repository 112 of conversation workflows defined and configured as described above with reference to FIGS. 4C and 4D) associated with a PDF file in response to one or more user interactions with the PDF file. Additional detail is now provided in FIG. 5 with regard to the process by which the document container and interactive communication system 102 identifies a conversation workflow. As an initial matter, the document container and interactive communication system 102 can perform the acts illustrated in FIG. 5 on the server(s) 106. Alternatively, the document container and interactive communication system 102 can cause the acts illustrated in FIG. 5 to be performed by the document container embedded within a webpage displayed on the client computing device 108.

Figure 5:
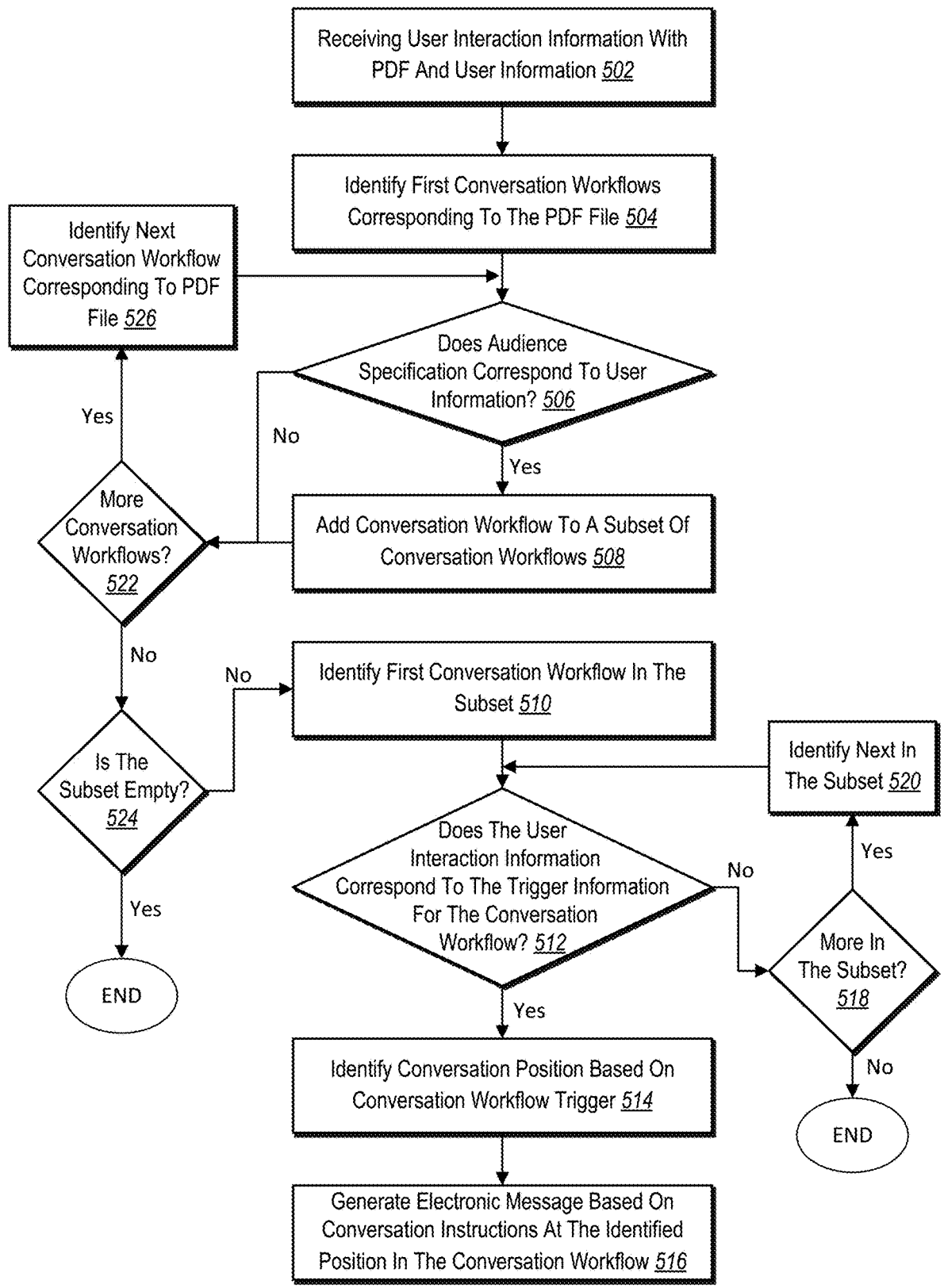
FIG. 5 illustrates a state diagram of determining a conversation workflow associated with a PDF file in response to one or more user interactions with the PDF file in accordance with one or more embodiments.

As illustrated in FIG. 5, the document container and interactive communication system 102 can receive user interaction information in connection with the PDF file along with user information in act 502. For example, the document container and interactive communication system 102 can receive the user interaction and user information from the document container embedded at the client computing device 108. In one or more embodiments, the document container may extract user information from a browser cookie, or another file stored on the client computing device 108.

In at least one embodiment, the user information associated with the user of the client computing device 108 can include, but is not limited to: demographic information associated with the user, firmographic information associated with the user, past activity information associated with the user, or interaction information associated with the user relative to the portable document format file. Similarly, user interaction information can include information associated with, but not limited to: opening the portable document format file, viewing one or more pages of the portable document format file, downloading the portable document format file, printing the portable document format file, searching the portable document format file, bookmarking the portable document format file, zooming in or out on the portable document format file, copying one or more portions of the portable document format file, or clicking on a hyperlink in the portable document format file. The document container and interactive communication system 102 can further receive document information associated with the PDF file including, but not limited to: the PDF file title, the PDF file contents, and metadata associated with the PDF file.

In response to receiving this information, the document container and interactive communication system 102 can identify a first conversation workflow corresponding to the PDF file in act 504. For instance, a PDF file may be associated with multiple conversation workflows where each conversation workflow is tailored to a particular audience. As such, the document container and interactive communication system 102 can identify the first conversation workflows that corresponds to the PDF file based on matching a title, metadata, or other information associated with the PDF file to the title, metadata, or other information associated with the first conversation workflow.

The document container and interactive communication system 102 can further determine if an audience specification associated with the first conversation workflow corresponds to the received user information in act 506. For example, each conversation workflow may be associated with an audience specification (e.g., as part of the metadata associated with the conversation workflow) that outlines or specifies one or more target audience criteria for that conversation workflow. To illustrate, the audience specification associated with the first conversation workflow may include target characteristics such as a user gender (e.g., female), a user age (e.g., 25-35), a user location (e.g., mid-west United States), an occupation level (e.g., middle-management), and common web activity (e.g., commonly visited websites and social media platforms).

The document container and interactive communication system 102 can determine that the user of the client computing device 108 corresponds to the audience specification of the first conversation workflow by determining that there is a threshold correspondence between the user information associated with the user of the client computing device 108 and the audience specification associated with the first conversation workflow. For example, the document container and interactive communication system 102 can determine that there is a threshold correspondence by identifying a threshold number of matches between the user information associated with the user of the client computing device 108 and the audience specification associated with the first conversation workflow.

Additionally or alternatively, the document container and interactive communication system 102 can determine that there is a threshold correspondence by calculating a weighted score for the user of the client computing device 108 where certain matches are given a heavier weight than others. For example, the document container and interactive communication system 102 can give greater weight for demographic information matches than for location information matches between the user information associated with the user of the client computing device 108 and the audience specification associated with the first conversation workflow. If the resulting weighted score is higher than a predetermined score, the document container and interactive communication system 102 can determine that there is a threshold correspondence between the user information associated with the user of client computing device 108 and the audience specification associated with the first conversation workflow.

If the document container and interactive communication system 102 determines that the audience specification does not correspond to the user information (e.g., "No" in the act 506), the document container and interactive communication system can attempt to identify another conversation workflow that corresponds to the PDF file. For example, the document container and interactive communication system 102 can determine whether more conversation workflows exist (e.g., in the conversation workflow repository 112) that correspond to the PDF file in act 522. If additional conversation workflows exist (e.g., "Yes" in the act 522), the document container and interactive communication system 102 can identify the next conversation workflow corresponding to the PDF file in act 526, and perform the act 506 again in connection with the next conversation workflow.

If the audience specification associated with the first conversation workflow corresponds to the user information (e.g., "Yes" in the act 506), the document container and interactive communication system 102 can add the conversation workflow to a subset of conversation workflows in act 508. In at least one embodiment, the document container and interactive communication system 102 can then perform the acts 522, 526, and 506 in order with next conversation workflows that correspond to the PDF file. The document container and interactive communication system 102 can continue to loop through these acts until determining, in the act 522, that no additional conversation workflows exist that correspond to the PDF file (e.g., "No" in the act 522). At that point, the document container and interactive communication system 102 can determine whether the subset of conversation workflows is empty in act 524. For example, an empty subset indicates that there were no conversation workflows in the conversation workflow repository corresponds to both the PDF file and the user information associated with the user of the client computing device 108. If the subset is not empty, it indicates that at least one conversation workflow exists that corresponds to the PDF file and the user information associated with the user of the client computing device 108. If the subset is empty (e.g., "Yes" in the act 524), the document container and interactive communication system 102 can end. Alternatively, if the subset is empty, the document container and interactive communication system 102 can perform the act 502 again with newly received interaction information.

If the subset is not empty (e.g., "No" in the act 524), the document container and interactive communication system 102 can identify the first conversation workflow in the subset, in act 510, and determine whether the user interaction information corresponds to the trigger information for the first conversation workflow, in act 512. For example, the trigger information for the first conversation workflow may indicate one or more user actions that are conversation workflow triggers. Each conversation workflow trigger may further define an associated conversation position within the first conversation workflow that can be utilized to generate an electronic message. In one or more embodiments, the document container and interactive communication system 102 can determine that the user interaction information corresponds to at least one trigger associated with the first conversation workflow by string matching, pattern matching, or via machine learning. For instance, the document container and interactive communication system 102 may determine that scrolling the PDF file such that the third page of the PDF file is only partially viewable within the document container satisfies the conversation workflow trigger defined as "access PDF file third page."

If the user interaction information does not correspond to the trigger information for the first conversation workflow (e.g., "No" in the act 512"), the document container and interactive communication system 102 can determine whether there are more conversation workflows in the subset in act 518. If there are additional conversation workflows in the subset (e.g., "Yes" in the act 518), the document container and interactive communication system 102 can identify the next conversation workflow in the subset, in the act 520, and repeat the act 512 with the next conversation workflow. If there are no additional conversation workflows in the subset (e.g., "No" in the act 518), the document container and interactive communication system 102 can end. Alternatively, if there are no additional conversation workflows in the subset, the document container and interactive communication system 102 can perform the act 502 again with newly received interaction information.

If the user interaction information does correspond to at least one trigger associated with the first conversation workflow (e.g., "Yes" in the act 512), the document container and interactive communication system 102 can identify a conversation position based on the conversation workflow trigger in act 514. For example, as mentioned above, the conversation workflow trigger may be configured to refer to both a corresponding user interaction (or combination of user interactions), and a conversation position. To illustrate, a conversation workflow trigger corresponding to an initial user interaction (e.g., accessing the PDF file for the first time) may further define an initial conversation position in the conversation workflow. A conversation workflow trigger corresponding to a different type of interaction with the PDF file (e.g., selecting a hyperlink in the PDF file) may further define a conversation position that is specific to that type of interaction.

After identifying the conversation position, the document container and interactive communication system 102 can generate an electronic message based on conversation instruction at the identified conversation position in the conversation workflow in act 516. For example, as mentioned above, every conversation position in the conversation workflow includes conversation instructions such as one or more conversation prompts. Thus, the document container and interactive communication system 102 can generate the electronic message including the text specified by a conversation prompts at the identified conversation position in the conversation workflow. In at least one embodiment, the document container and interactive communication system 102 can further cause a communication graphical user interface to be initialized with the generated electronic message and provided to the client computing device 108 in connection with the webpage displayed thereon.

Figure 6:
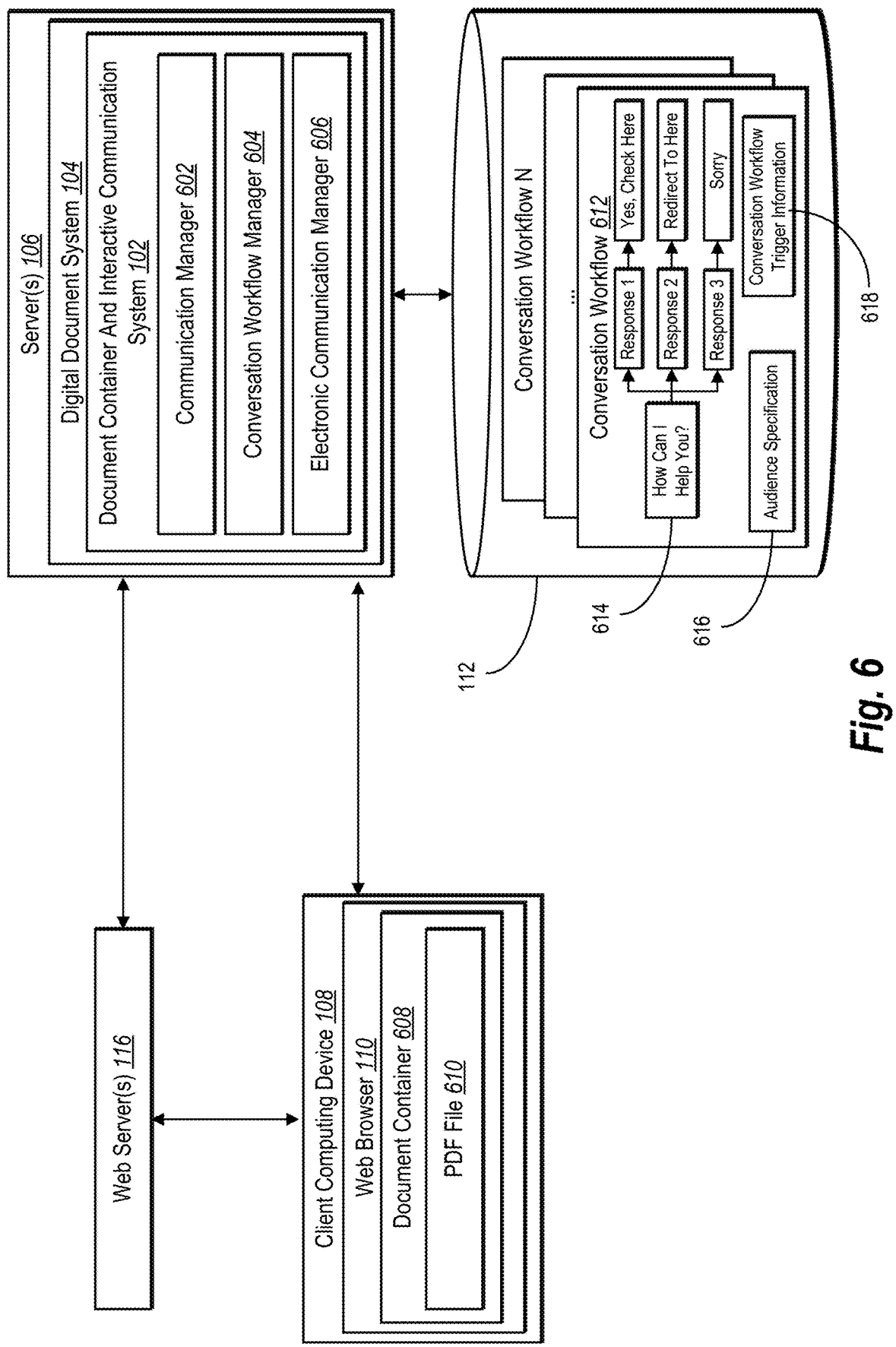
FIG. 6 illustrates a schematic diagram of the document container and interactive communication system in accordance with one or more embodiments.

As described in relation in FIGS. 1-5, the document container and interactive communication system 102 generates embeddable document containers for providing PDF files for display within a webpage. The document container and interactive communication system 102 further initiates electronic chat sessions with a viewing user based on a conversation workflow that is triggered based on user interactions with a PDF file provided in an embedded document container. FIG. 6 illustrates a detailed schematic diagram of an embodiment of the document container and interactive communication system 102 described above. Although illustrated as part of the digital document system 104 on the server(s) 106, as mentioned above, the document container and interactive communication system 102, in part or in whole, can be implemented by one or more different or additional computing devices. In one or more embodiments, the document container and interactive communication system 102 includes a communication manager 602, a conversation workflow manager 604, and an electronic communication manager 606.

As mentioned, the document container and interactive communication system 102 includes the communication manager 602. In one or more embodiments, the communication manager 602 handles all communications between the document container and interactive communication system 102 and a document container 608 embedded within a webpage displayed by the web browser 110. For example, the communication manager 602 can receive indications of user interactions with a PDF file 610 provided by the document container 608 from the client computing device 108. The communication manager 602 can further provide generated electronic messages, communication graphical user interfaces, and conversation workflows to the document container 608 and/or the web server(s) 116, or any other third-party communication platform.

As mentioned above, and as further shown in FIG. 6, the document container and interactive communication system 102 also includes the conversation workflow manager 604. In one or more embodiments, the conversation workflow manager 604 identifies a conversation workflow based on information received from the client computing device 108. For example, the conversation workflow manager 604 can identify one or more conversation workflows from the conversation workflow repository 112 that correspond to received information associated with the PDF file 610 within the document container 608. For instance, the conversation workflow manager 604 can match a title a conversation workflow 612, and other conversation workflows, to a title of the PDF file 610. The conversation workflow manager 604 can further match metadata associated with the PDF file 610 to metadata associated with the conversation workflow 612.

The conversation workflow manager 604 can further the conversation workflow 612 by determining whether user information associated with the user of the client computing device 108 corresponds to an audience specification 616 associated with the conversation workflow 612. For example, the conversation workflow manager 604 can perform string matching, metadata matching, and/or machine learning to determine that there is a threshold correspondence between the user of the client computing device 108 and the audience specification 616 of the conversation workflow 612. In at least one embodiment, the conversation workflow manager 604 identifies at least one conversation workflow that corresponds to both the PDF file 610 and the user of the client computing device 108.

In one or more embodiments, the conversation workflow manager 604 determines whether the conversation workflow 612 can be used by determining whether the detected user interactions with the PDF file 610 include a conversation workflow trigger associated with the conversation workflow 612. For example, the conversation workflow manager 604 can identify a match or at least a level of correspondence between the detected user interactions with the PDF file 610 and the conversation workflow trigger information 618. In at least one embodiment, the conversation workflow trigger information 618 can specify that the conversation workflow 612 may be triggered in a variety of ways. Thus, the conversation workflow manager 604 can determine that the user interactions include a conversation workflow trigger by analyzing the user interactions (e.g., via machine learning) to identify a match or threshold correspondence between the user interactions and the conversation workflow trigger information 618.

As mentioned above, and as further shown in FIG. 6, the document container and interactive communication system 102 also includes the electronic communication manager 606. In one or more embodiments, the electronic communication manager 606 identifies a conversation position in the identified conversation workflow. For example, the electronic communication manager 606 can identify a conversation position in the conversation workflow 612 based on an analysis of the conversation workflow trigger identified in the user interactions in connection with the user information associated with the user of the client computing device 108. For instance, the electronic communication manager 606 can determine that the conversation workflow trigger is an initial trigger—meaning that the user of the client computing device 108 is accessing the PDF file 610 for the first time. In response to determining that the conversation workflow trigger is an initial trigger, the electronic communication manager 606 can identify an initial conversation position 614 in the conversation workflow 612. In response to determining that the conversation workflow trigger is associated with user interactions and/or user information indicating previous contact between the user of the client computing device 108 and the PDF file 610, the electronic communication manager 606 can identify a subsequent conversation position in the conversation workflow 612.

In one or more embodiments, the electronic communication manager 606 generates an electronic message. For example, in response to identifying a conversation position in the conversation workflow 612, the electronic communication manager 606 can generate one or more electronic messages based on the communication instructions and prompts at that conversation position. In at least one embodiment, the electronic communication manager 606 can generate the one or more electronic messages for display via a communication graphical user interface configured to be displayed within the web browser 110 in connection with the webpage where the document container 608 is embedded. For instance, the electronic communication manager 606 can provide the communication graphical user interface such that: the communication graphical user interface is overlaid on the PDF file 610 (e.g., thereby deactivating the PDF file 610), the communication graphical user interface is displayed adjacent to the document container 608 (e.g., so that the PDF file 610 may still be seen and interacted with), or in a different portion of the webpage where the document container 608 is embedded.

Each of the components 602-606 of the document container and interactive communication system 102 can include software, hardware, or both. For example, the components 602-606 can include one or more instructions stored on a computer-readable storage medium and executable by processors of one or more computing devices, such as a client device or server device. When executed by the one or more processors, the computer-executable instructions of the document container and interactive communication system 102 can cause the computing device(s) to perform the methods described herein. Alternatively, the components 602-606 can include hardware, such as a special-purpose processing device to perform a certain function or group of functions. Alternatively, the components 602-606 of the document container and interactive communication system 102 can include a combination of computer-executable instructions and hardware.

Furthermore, the components 602-606 of the document container and interactive communication system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 602-606 may be implemented as a stand-alone application, such as a desktop or mobile application. Furthermore, the components 602-606 may be implemented as one or more web-based applications hosted on a remote server. The components 602-606 may also be implemented in a suite of mobile device applications or "apps." To illustrate, the components 602-606 may be implemented in an application, including but not limited to ADOBE DOCUMENT CLOUD PLATFORM, ADOBE ANALYTICS CLOUD, such as ADOBE ANALYTICS, ADOBE AUDIENCE MANAGER, ADOBE CAMPAIGN, ADOBE EXPERIENCE MANAGER, and ADOBE TARGET. "ADOBE", "ADOBE DOCUMENT CLOUD PLATFORM," "ANALYTICS CLOUD", "ANALYTICS", "AUDIENCE MANAGER", "CAMPAIGN", "EXPERIENCE MANAGER", "TARGET," and "CREATIVE CLOUD" are either registered trademarks or trademarks of Adobe Systems Incorporated in the United States and/or other countries.

Figure 7:
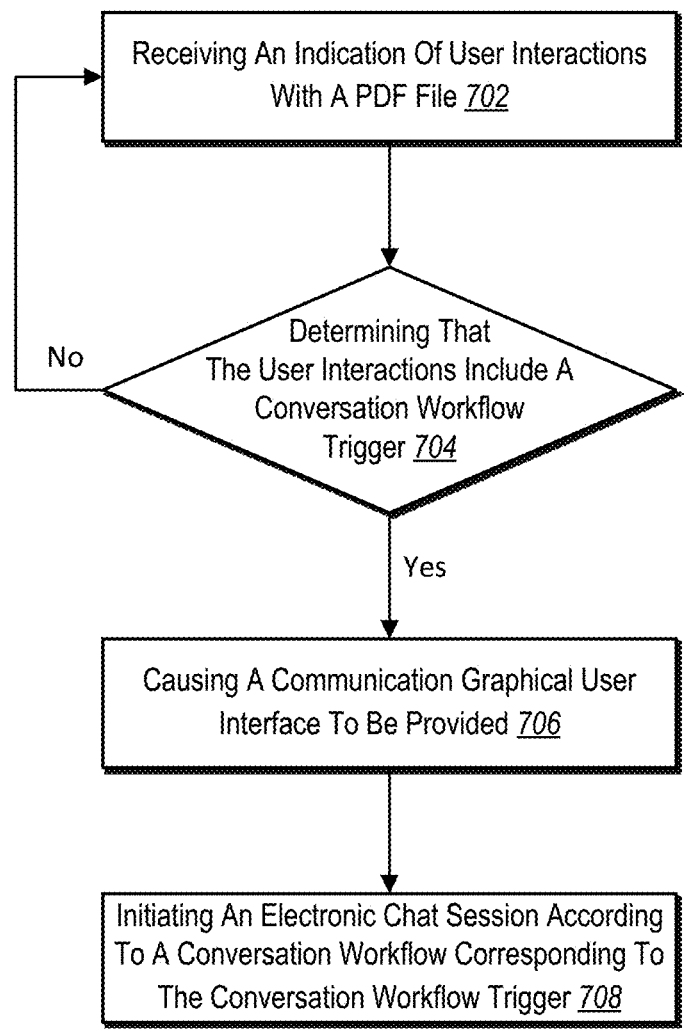
FIG. 7 illustrates a flowchart of a series of acts identifying a conversation workflow to initiate an electronic chat session with a user viewing a PDF file via an embedded document container in accordance with one or more embodiments in accordance with one or more embodiments.

FIGS. 1-6, the corresponding text, and the examples provide a number of different methods, systems, devices, and non-transitory computer-readable media of the document container and interactive communication system 102. In addition to the foregoing, one or more embodiments can also be described in terms of flowcharts comprising acts for accomplishing a particular result, as shown in FIG. 7. FIG. 7 may be performed with more or fewer acts. Further, the acts may be performed in differing orders. Additionally, the acts described herein may be repeated or performed in parallel with one another or parallel with different instances of the same or similar acts.

As mentioned, FIG. 7 illustrates a flowchart of a series of acts 700 for identifying a conversation workflow to initiate an electronic chat session with a user viewing a PDF file via an embedded document container in accordance with one or more embodiments. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer-readable medium can comprise instructions that, when executed by one or more processors, cause a computing device to perform the acts of FIG. 7. In some embodiments, a system can perform the acts of FIG. 7.

As shown in FIG. 7, the series of acts 700 includes an act 702 of receiving an indication of user interactions with a PDF file. For example, the act 702 can involve receiving, from a document container embedded into a webpage displayed by a client computing device, an indication of one or more user interactions detected in connection with a portable document format file. In one or more embodiments, the one or more user interactions detected in connection with the portable document format file include one or more of: opening the portable document format file, viewing one or more pages of the portable document format file, downloading the portable document format file, printing the portable document format file, searching the portable document format file, bookmarking the portable document format file, zooming in or out on the portable document format file, copying one or more portions of the portable document format file, or clicking on a hyperlink in the portable document format file. In one or more embodiments, the series of acts 700 further includes causing the document container to be embedded in the webpage according to one of: a full-window embedding mode, a sized container embedding mode, an in-line embedding mode, or a light-box embedding mode.

In at least one embodiment, the series of acts 700 includes acts of determining document information associated with the portable document format file; and identifying the conversation workflow based on the document information. The series of acts 700 can also include an act of identifying the conversation workflow based on an audience specification associated with the conversation workflow. For example, the series of acts 700 can include determining that the user of the client computing device corresponds to the audience specification associated with the conversation workflow by: identifying user information associated with the user of the client computing device; and determining that there is a threshold correspondence between the user information associated with the user of client computing device and the audience specification associated with the conversation workflow. In one or more embodiments, identifying user information associated with the user of the client computing device includes identifying one or more of: demographic information associated with the user, firmographic information associated with the user, past activity information associated with the user, or interaction information associated with the user relative to the portable document format file.

Additionally, the series of acts 700 includes an act 704 of determining that the user interactions include a conversation workflow trigger. For example, the act 704 can involve determining whether the one or more user interactions detected in connection with the portable document format file comprise a conversation workflow trigger corresponding to a conversation workflow associated with the portable document format file.

The series of acts 700 also includes an act 706 of causing a communication graphical user interface to be provided. For example, the act 706 can involve, in response to determining that the one or more user interactions comprise the conversation workflow trigger, causing a communication graphical user interface to be provided in connection with the webpage. In at least one embodiment, the series of acts further includes deactivating the portable document format file within the document container in response to detecting that the communication graphical user interface is provided in connection with the webpage.

Furthermore, the series of acts 700 includes an act 708 of initiating an electronic chat session according to a conversation workflow corresponding to the conversation workflow trigger. For example, the act 708 can involve initiating an electronic chat session with a user of the client computing device according to the conversation workflow via the communication graphical user interface. In one or more embodiments, initiating the electronic chat session according to the conversation workflow can include: identifying past activity information associated with the user, and interaction information associated with the user relative to the portable document format file; and identifying a conversation prompt within the conversation workflow based on the identified past activity information and interaction information. Additionally, initiating the electronic chat session according to the conversation workflow can include: identifying an initial conversation prompt in the conversation workflow; generating an electronic message comprising the initial conversation prompt; and providing the electronic message via the communication graphical user interface.

In addition (or in the alternative) to the acts described above, in some embodiments, the series of acts 700 include performing a step for determining a conversation workflow associated with the portable document format file in response to detecting a conversation workflow trigger. For instance, the algorithms and acts described in relation to FIG. 5 can comprise the corresponding acts for a step for determining a conversation workflow associated with the portable document format file in response to detecting a conversation workflow trigger.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 8:
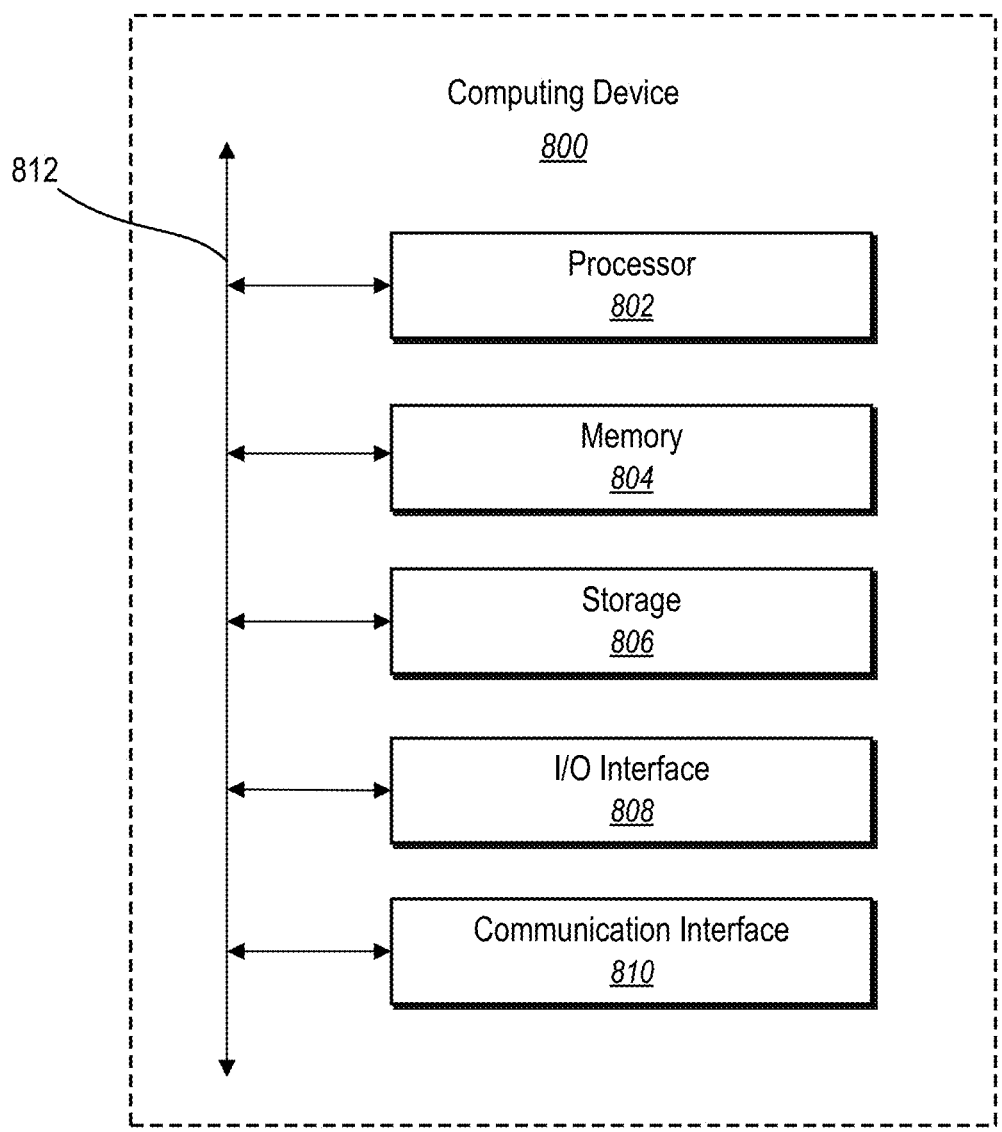
FIG. 8 illustrates a block diagram of an example computing device for implementing one or more embodiments of the present disclosure.

FIG. 8 illustrates a block diagram of an example computing device 800 that may be configured to perform one or more of the processes described above. One will appreciate that one or more computing devices, such as the computing device 800 may represent the computing devices described above (e.g., the server(s) 106). In one or more embodiments, the computing device 800 may be a mobile device (e.g., a mobile telephone, a smartphone, a PDA, a tablet, a laptop, a camera, a tracker, a watch, a wearable device, etc.). In some embodiments, the computing device 800 may be a non-mobile device (e.g., a desktop computer or another type of client device). Further, the computing device 800 may be a server device that includes cloud-based processing and storage capabilities.

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of computing device 800 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computer system to:
   receive, from a document container embedded into a webpage displayed by a client computing device, an indication of one or more user interactions with a portable document format file displayed within the embedded document container;
   determine that a user of the client computing device corresponds to an audience specification correlated with a conversation workflow associated with the portable document format file by:
      identifying user information associated with the user of the client computing device; and
      determining that there is a threshold correspondence between the user information associated with the user of the client computing device and the audience specification associated with the conversation workflow;
   determine that the one or more user interactions with the portable document format file comprise a conversation workflow trigger corresponding to the conversation workflow associated with the portable document format file;

in response to determining that the one or more user interactions with the portable document format file comprise the conversation workflow trigger and that the user of the client computing device corresponds to the audience specification, cause a communication graphical user interface to be overlaid on the embedded document container; and initiate an electronic chat session with a user of the client computing device according to the conversation workflow via the communication graphical user interface overlaid on the embedded document container.

2. The non-transitory computer-readable medium as recited in claim 1, wherein the one or more user interactions with the portable document format file displayed within the embedded document container comprise one or more of: opening the portable document format file, viewing one or more pages of the portable document format file, downloading the portable document format file, printing the portable document format file, searching the portable document format file, bookmarking the portable document format file, zooming in or out on the portable document format file, copying one or more portions of the portable document format file, or clicking on a hyperlink in the portable document format file.

3. The non-transitory computer-readable medium as recited in claim 1, further storing instructions that, when executed by the at least one processor, cause the computer system to:

determine document information associated with the portable document format file; and identify the conversation workflow based on the document information.

4. The non-transitory computer-readable medium as recited in claim 1, wherein identifying user information associated with the user of the client computing device comprises identifying one or more of: demographic information associated with the user, firmographic information associated with the user, past activity information associated with the user, or interaction information associated with the user relative to the portable document format file.

5. The non-transitory computer-readable medium as recited in claim 1, further storing instructions that, when executed by the at least one processor, cause the computer system to initiate the electronic chat session according to the conversation workflow by:

identifying past activity information associated with the user, and interaction information associated with the user relative to the portable document format file; and identifying a conversation prompt within the conversation workflow based on the identified past activity information and interaction information.

6. The non-transitory computer-readable medium as recited in claim 1, further storing instructions that, when executed by the at least one processor, cause the computer system to deactivate the portable document format file within the document container in response to detecting that the communication graphical user interface is overlaid on the embedded document container.

7. The non-transitory computer-readable medium as recited in claim 1, further storing instructions that, when executed by the at least one processor, cause the computer system to cause the document container to be embedded in the webpage according to one of: a full-window embedding mode, a sized container embedding mode, an in-line embedding mode, or a light-box embedding mode.

8. A system comprising:

at least one processor; and at least one non-transitory computer-readable storage medium storing instructions that, when executed by the at least one processor, cause the system to:

receive, from a document container embedded into a webpage displayed by a client computing device, an indication of one or more user interactions with a portable document format file displayed within the embedded document container;

in response to determining that the one or more user interactions with the portable document format file comprise a conversation workflow trigger:

identify document information associated with the portable document format file, identify a conversation workflow associated with the document information associated with the portable document format file displayed within the embedded document container;

determine that a user of the client computing device corresponds to an audience specification correlated with the conversation workflow associated with the portable document format file by:

identifying user information associated with the user of the client computing device; and determining that there is a threshold correspondence between the user information associated with the user of the client computing device and the audience specification associated with the conversation workflow;

in response to determining that there is a threshold correspondence between the user information associated with the user of the client computing device and the audience specification associated with the conversation workflow, cause a communication graphical user interface to be overlaid on the embedded document container; and initiate an electronic chat session with the user of the client computing device according to the conversation workflow via the communication graphical user interface overlaid on the embedded document container.

9. The system as recited in claim 8, wherein identifying user information associated with the user of the client computing device comprises identifying one or more of: demographic information associated with the user, firmographic information associated with the user, past activity information associated with the user, or interaction information associated with the user relative to the portable document format file.

10. The system as recited in claim 8, further storing instructions that, when executed by the at least one processor, cause the system to initiate the electronic chat session according to the conversation workflow by:

identifying an initial conversation prompt in the conversation workflow;

generating an electronic message comprising the initial conversation prompt; and providing the electronic message via the communication graphical user interface overlaid on the embedded document container.

11. The system as recited in claim 8, further storing instructions that, when executed by the at least one processor, cause the system to initiate the electronic chat session according to the conversation workflow by:
- identifying past activity information associated with the user and interaction information associated with the user relative to the portable document format file; and
- identifying a conversation prompt within the conversation workflow based on the identified past activity information and interaction information;
- generating an electronic message comprising the identified conversation prompt; and
- providing the electronic message via the communication graphical user interface overlaid on the embedded document container.

12. The system as recited in claim 8, further storing instructions that, when executed by the at least one processor, cause the system to deactivate the portable document format file within the document container in response to detecting that the communication graphical user interface is overlaid on the embedded document container.

13. The system as recited in claim 8, further storing instructions that, when executed by the at least one processor, cause the system to cause the document container to be embedded in the webpage according to one of: a full-window embedding mode, a sized container embedding mode, an in-line embedding mode, or a light-box embedding mode.

14. A computer-implemented method comprising:
- receiving, from a document container embedded into a webpage displayed by a client computing device, an indication of one or more user interactions with a portable document format file displayed within the embedded document container;
- a step for determining a conversation workflow associated with the portable document format file in response to detecting a conversation workflow trigger;
- determining that a user of the client computing device corresponds to an audience specification correlated with the conversation workflow associated with the portable document format file by:
  - identifying user information associated with the user of the client computing device; and
  - determining that there is a threshold correspondence between the user information associated with the user of the client computing device and the audience specification associated with the conversation workflow;
- in response to determining that the user of the client computing device corresponds to the audience specification correlated with the conversation workflow associated with the portable document format file, causing a communication graphical user interface to be overlaid on the embedded document container; and
- initiating an electronic chat session with a user of the client computing device according to the conversation workflow via the communication graphical user interface overlaid on the embedded document container.

15. The method as recited in claim 14, wherein the one or more user interactions with the portable document format file displayed within the embedded document container comprise one or more of: opening the portable document format file, viewing one or more pages of the portable document format file, downloading the portable document format file, printing the portable document format file, searching the portable document format file, bookmarking the portable document format file, zooming in or out on the portable document format file, copying one or more portions of the portable document format file, or clicking on a hyperlink in the portable document format file.

16. The method as recited in claim 15, wherein initiating the electronic chat session with the user of the client computing device according to the conversation workflow comprises:
- identifying an initial conversation prompt in the conversation workflow;
- generating an electronic message comprising the initial conversation prompt; and
- providing the electronic message via the communication graphical user interface overlaid on the embedded document container.

17. The method as recited in claim 16, wherein identifying the initial conversation prompt in the conversation workflow is based on past activity information associated with the user and interaction information associated with the user relative to the portable document format file.

18. The method as recited in claim 14, wherein identifying user information associated with the user of the client computing device comprises identifying one or more of: demographic information associated with the user, firmographic information associated with the user, past activity information associated with the user, or interaction information associated with the user relative to the portable document format file.

19. The method as recited in claim 14, further comprising deactivating the portable document format file within the embedded document container in response to detecting that the communication graphical user interface is overlaid on the embedded document container.

20. The method as recited in claim 14, further comprising embedding the document container in the webpage according to one of: a full-window embedding mode, a sized container embedding mode, an in-line embedding mode, or a light-box embedding mode.

* * * * *